(12) United States Patent
Alexander et al.

(10) Patent No.: US 12,517,640 B2
(45) Date of Patent: *Jan. 6, 2026

(54) SYSTEM AND METHOD FOR SPLITTING AN IMAGE ACROSS A PLURALITY OF TILES

(71) Applicant: Tracer Imaging LLC, Ossining, NY (US)

(72) Inventors: James Alexander, Mount Kisco, NY (US); Jerry Brace, Coquitlam, CA (US); Elena Kurevija, Brooklyn, NY (US); Mofoluke Okeremi, White Plains, NY (US)

(73) Assignee: Tracer Imaging LLC, Ossining, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/662,088

(22) Filed: May 13, 2024

(65) Prior Publication Data

US 2024/0295955 A1 Sep. 5, 2024

Related U.S. Application Data

(63) Continuation of application No. 17/667,093, filed on Feb. 8, 2022, now Pat. No. 12,001,663.

(60) Provisional application No. 63/147,160, filed on Feb. 8, 2021.

(51) Int. Cl.
| | |
|---|---|
| *G06F 3/04845* | (2022.01) |
| *G06F 3/04847* | (2022.01) |
| *G06T 3/40* | (2024.01) |
| *G06T 7/10* | (2017.01) |

(52) U.S. Cl.
CPC ...... *G06F 3/04845* (2013.01); *G06F 3/04847* (2013.01); *G06T 3/40* (2013.01); *G06T 7/10* (2017.01); *G06T 2200/24* (2013.01)

(58) Field of Classification Search
None
See application file for complete search history.

(56) References Cited

U.S. PATENT DOCUMENTS

| | | | |
|---|---|---|---|
| 5,687,307 A | 11/1997 | Akisada et al. | |
| 6,568,938 B1 | 5/2003 | Prince et al. | |
| 6,668,082 B1 | 12/2003 | Davison et al. | |
| 12,001,663 B2 * | 6/2024 | Alexander | ............ G06F 3/0488 |

(Continued)

OTHER PUBLICATIONS

La Photo Party, Billboard—Overview, Feb. 21, 2019, https://support.laphotoparty.com/support/solutions/articles/5000807749-billboard-overview (retrieved on Apr. 19, 2022).

*Primary Examiner* — Henry Orr
(74) *Attorney, Agent, or Firm* — Leason Ellis LLP

(57) ABSTRACT

A system and method for editing and outputting an image, for example, for wall or other décor. Tools enable a user to parse a single image, such as a photograph, substantially automatically across a grid of multiple tiles. In addition to parsing, various kinds of image editing are provided as a function of tools in an innovative graphical user interface operating on a smart phone or one or more computing devices. Various operations are performed on an image that has been parsed across a grid of multiple tiles to provide for a custom output, such as for displaying an image uniquely on a wall or other surface.

18 Claims, 35 Drawing Sheets
(33 of 35 Drawing Sheet(s) Filed in Color)

(56) References Cited

U.S. PATENT DOCUMENTS

| | | | |
|---|---|---|---|
| 2002/0188632 A1* | 12/2002 | Su | G06F 16/958 |
| | | | 707/E17.116 |
| 2004/0076345 A1* | 4/2004 | Olszak | G06F 16/58 |
| | | | 707/E17.026 |
| 2011/0013226 A1 | 1/2011 | Grosz et al. | |
| 2013/0125039 A1* | 5/2013 | Murata | G06T 11/60 |
| | | | 715/781 |
| 2013/0202051 A1* | 8/2013 | Zhou | H04N 19/521 |
| | | | 375/240.26 |
| 2014/0096021 A1* | 4/2014 | Gowen | G06F 40/186 |
| | | | 715/738 |
| 2015/0082211 A1 | 3/2015 | Lee | |
| 2015/0335305 A1 | 11/2015 | Moon et al. | |
| 2016/0098598 A1 | 4/2016 | Pahwa et al. | |
| 2018/0218528 A1 | 8/2018 | Kim et al. | |

\* cited by examiner

SYSTEM AND METHOD FOR SPLITTING AN IMAGE ACROSS A PLURALITY OF TILES

CROSS-REFERENCE TO RELATED APPLICATIONS

The patent application is based on and claims priority to U.S. patent application Ser. No. 17/667,093, filed Feb. 8, 2022, which is based on and claims priority to U.S. Provisional Patent Application Ser. No. 63/147,160, filed on Feb. 8, 2021, the entire contents of all of which are incorporated by reference as if expressly set forth in its entirety herein.

FIELD OF THE INVENTION

The present disclosure relates, generally, to image processing and, more particularly, to a user interface and processes for providing new formats of existing images.

BACKGROUND

The proliferation of cameras in consumer electronics has led to a massive increase in image capture and creation. Cameras that are released by camera manufacturers as well as cameras that are integrated in smartphones generate images at ever increasing resolutions (e.g., megapixel counts) and quality. Accordingly, individuals and businesses alike continue to create multitudes of images on a daily basis that has outnumbered those of any time.

One result of such image proliferation is a demand for solutions in image output and printing. In addition to viewing images on display devices, e.g., display screens on smartphones, tablet and other kinds of computers, businesses and individuals have created an ever-increasing demand for high-quality printed output of images in a variety of formats, conveniently and creatively.

The present system and method address deficiencies in the art and provide tools for particular forms of image editing and output.

BRIEF SUMMARY

In one or more implementations of the present disclosure, a system, method, and/or computer program product accessing stored program instructions are provided. A graphical user interface is provided on a device configured with at least one processor, and information representing an image is received, via the graphical user interface. The image is displayed, via the graphical user interface. Moreover, at least one value is received, via at least one graphical screen control provided in the graphical user interface. Thereafter, the image is parsed into an initial plurality of tiles, as a function of the at least one value. The image is displayed, via the graphical user interface, parsed into the initial plurality of tiles, wherein each of the initial plurality of tiles is separated by an amount of space. Moreover, an update to the at least one value is received, via the graphical user interface, and the image is parsed into an updated plurality of tiles, as a function of the update to the at least one value. Thereafter, the image parsed into the updated plurality of tiles is automatically displayed, via the graphical user interface, wherein each of the updated plurality of tiles is separated by the amount of space.

Further, in one or more implementations an x-axis slider control and a y-axis slider control can be provided, via the graphical user interface, wherein the at least one value is received as a function of a position of the x-axis slider control and the y-axis slider control, and further wherein the and the update to the at least one value is received as a function of a change in the position of at least one of the x-axis slider control and the y-axis slider control.

In one or more implementations, a value representing an update to the amount of space between tiles can be received, via the graphical user interface, and the image parsed into the updated plurality of tiles can be automatically displayed via the graphical user interface, wherein each of the updated plurality of tiles is separated by the updated amount of space.

In one or more implementations, a difference between a i) resolution of the image and a ii) resolution of the image being parsed into the updated plurality of tiles can be determined to exceed a threshold value. Further, a warning can be provided via the graphical user interface in response to the determined difference exceeding the threshold value. Moreover, the warning can be provided by altering a color of at least one screen control in the graphical user interface.

Still further, in one or more implementations, in response to an instruction received via the graphical user interface, a zoomed-in view of a portion of the image displayed in the graphical user interface can be provided.

In one or more implementations, at least a portion of the image parsed into the updated plurality of tiles can be determined to be eliminated by at least some of the amount of space separating the updated plurality of tiles.

In one or more implementations, the initial plurality of tiles can be positioned into a respective shape. Moreover, the respective shape can be defined as a function of at least one vector.

In one or more implementations, an instruction can provide prints of the updated plurality of tiles, and a payment for the prints of the updated plurality of tiles can be received, via the graphical user interface.

Additional features, advantages, and embodiments of the disclosure may be set forth or apparent from consideration of the detailed description and drawings. It is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various features, aspects and advantages of the invention can be appreciated from the following detailed description and the accompanying drawing figures, in which.

DETAILED DESCRIPTION OF THE EMBODIMENTS

By way of introduction and overview, the present disclosure provides a system and method for editing and outputting an image, for example, for wall or other décor. In one or more implementations, the present disclosure provides tools that enable a user to parse a single image, such as a photograph, substantially automatically across a grid of multiple tiles. For example, using tools shown and described herein, a single image can be parsed into a grid of 18 tiles (e.g., 3 tiles by 6 tiles, generally referred to herein as a 3×6 tile grid). In addition to parsing, various kinds of image editing, such as for adjusting color balance, scaling, cropping, sharpening, implementing various filters, selecting the color(s) and/or graphics appearing on the front and/or side of the frame, and providing an image in color or in grayscale or the like, as well as other sophisticated computing processes shown and described herein, can be provided as a function of tools in an innovative graphical user interface operating on a smart phone or one or more computing devices. In accordance with the teachings herein, various operations can be performed on an image that has been parsed across a grid of multiple tiles to provide for a custom and stylish output, such as for displaying an image uniquely on a wall or other surface.

Figure 1:
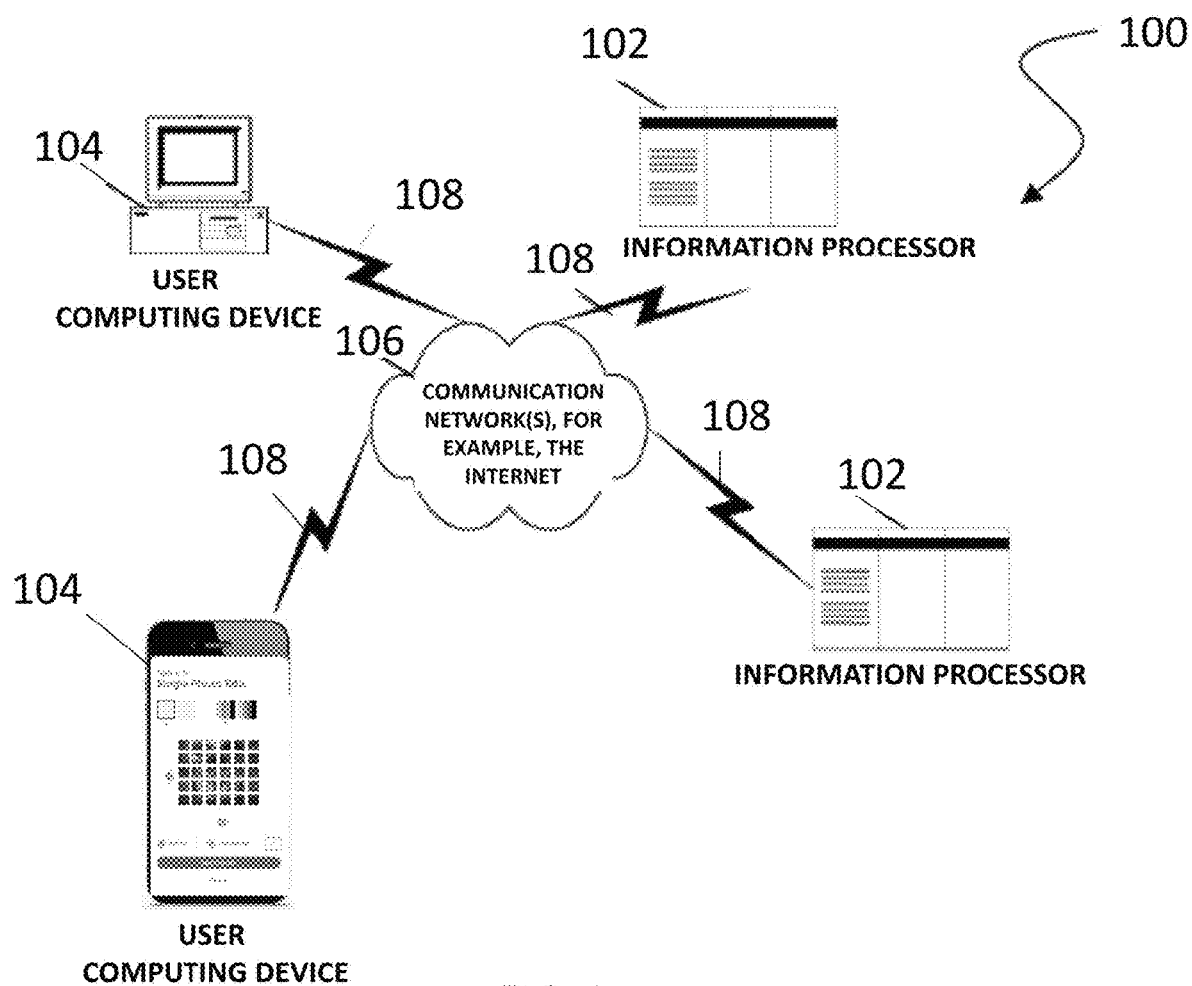
FIG. 1 is a block diagram illustrating a hardware arrangement in connection with an example implementation of the present application.

Referring now to the drawings figures in which like reference numerals refer to like elements, there is shown in FIG. 1 a diagram of an example hardware arrangement that operates for providing the systems and methods disclosed herein and designated generally as platform 100. Platform 100 is preferably comprised of one or more information processors 102 coupled to one or more user computing devices 104 across communication network 106. User computing devices 104 may include, for example, mobile computing devices such as tablet computing devices, smartphones, personal digital assistants or the like.

Information processor 102 preferably includes all necessary databases for the present application, including image files, metadata and other information. However, it is contemplated that information processor 102 can access any required databases via communication network 106 or any other communication network to which information processor 102 has access, including via connections 108. Information processor 102 can communicate devices comprising databases using any known communication method, including a direct serial, parallel, USB interface, or via a local or wide area network.

Figure 2:
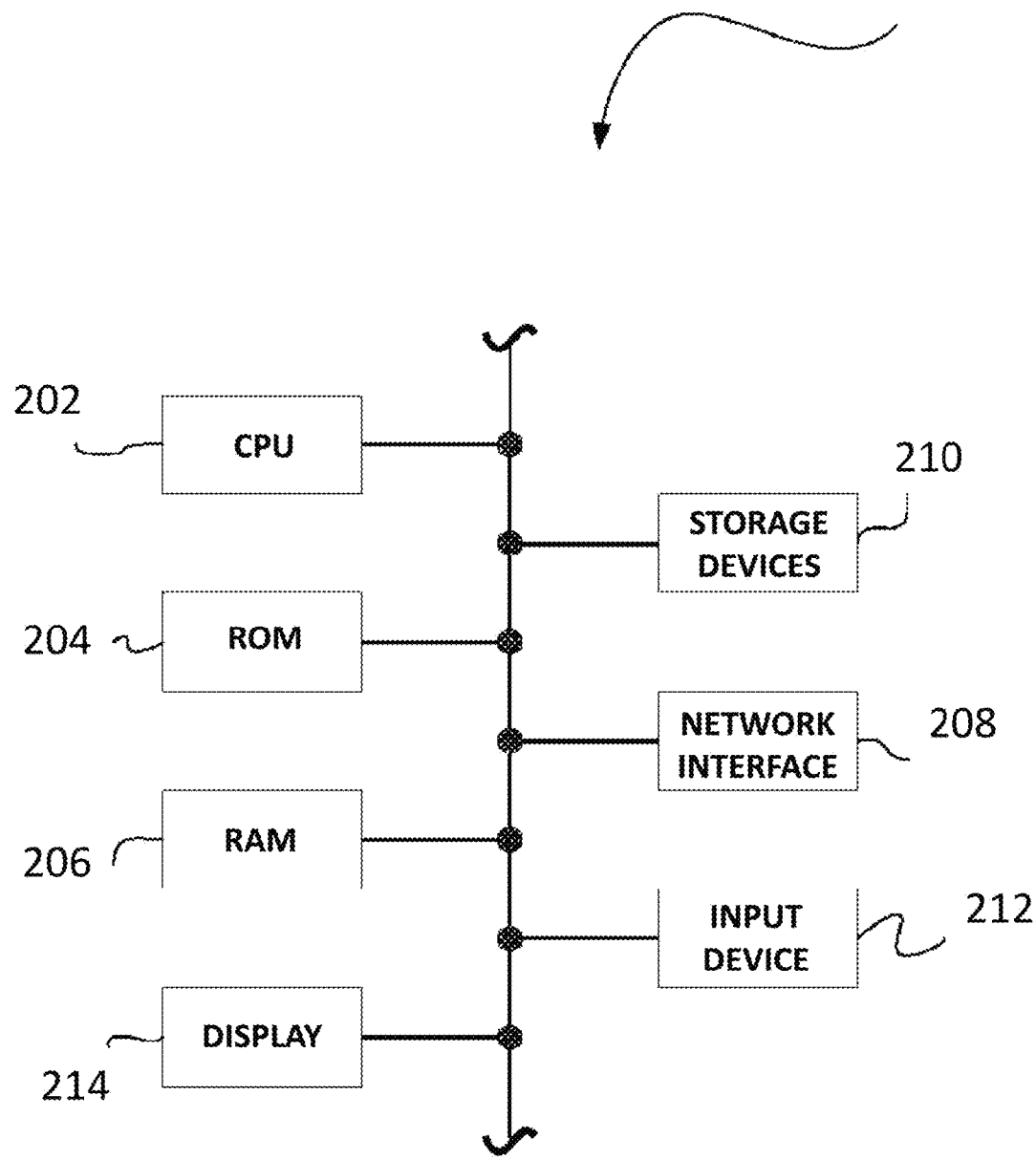
FIG. 2 shows example components and configurations of computing devices that can be used to implement the techniques described herein.

As shown in FIG. 2, the functional elements of each information processor 102 or user computing device 104, which preferably include one or more central processing units (CPU) 202 used to execute software code in order to control the operation of information processor 102, read only memory (ROM) 204, random access memory (RAM) 206, one or more network interfaces 208 to transmit and receive data to and from other computing devices across a communication network, storage devices 210 such as a hard disk drive, flash memory, CD-ROM or DVD drive for storing program code, databases and application code, one or more input devices 212 such as a keyboard, mouse, track ball and the like, and a display 214.

The various components of information processor 102 need not be physically contained within the same chassis or even located in a single location. For example, as explained above with respect to databases which can reside on storage device 210, storage device 210 may be located at a site which is remote from the remaining elements of information processors 102, and may be connected to CPU 202 across communication network 106 via network interface 308.

The functional elements shown in FIG. 2 (designated by reference numbers 202-214) are preferably the same categories of functional elements preferably present in information processors 102 and user computing device 104. However, not all elements need be present, for example, storage devices and the capacities of the various elements are arranged to accommodate expected user demand. For example, CPU 202 in user computing device 104 may be of a smaller capacity than CPU 202 as present in information processor 102. Similarly, it is likely that information processor 102 will include storage devices 210 of a much higher capacity than storage devices 210 present in user computing device 104. Of course, one of ordinary skill in the art will understand that the capacities of the functional elements can be adjusted as needed.

In one or more implementations of the present disclosure, a software application that can be configured to operate on a mobile computing device, referred to herein, generally, as a "mobile app," can include a graphical user interface that displays stored images. The computing device can be configured by the mobile app to provide options for a user, in accordance with the teaching therein.

The present disclosure provides tools, including via a graphical user interface operating on a mobile (or other) computing device, which enable a user to parse a single image such as a photograph across a grid of multiple tiles. Image editing operations, such as to adjust color balance, scaling, cropping, or the like, can also be provided. Examples of features and options provided in accordance with implementations of the present disclosure are shown and described in greater detail in and with reference to FIGS. 3-35.

Figure 3:
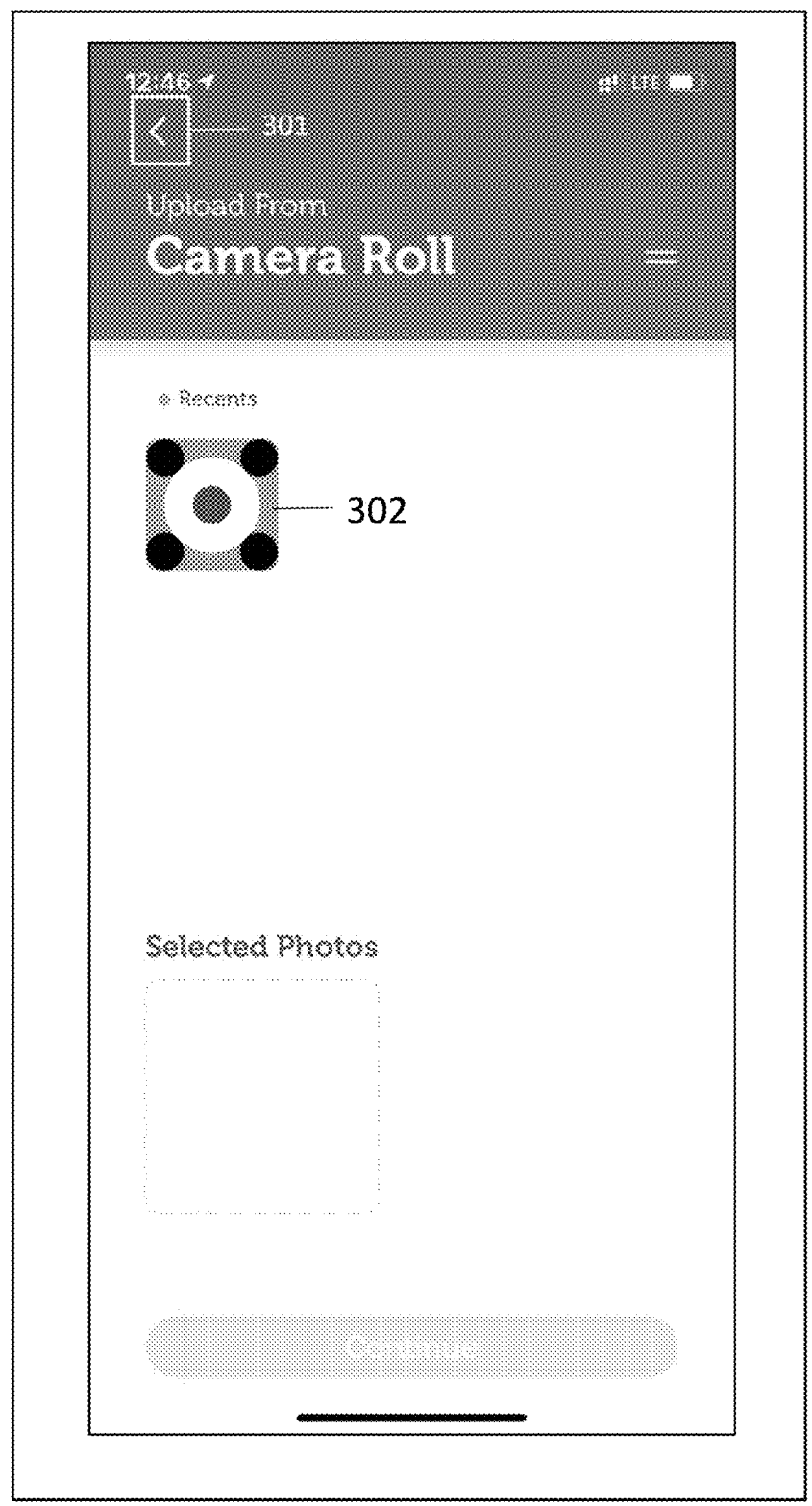
FIGS. 3-5 illustrate example graphical user interface display screens provided in accordance with an example implementation.
Figure 4:
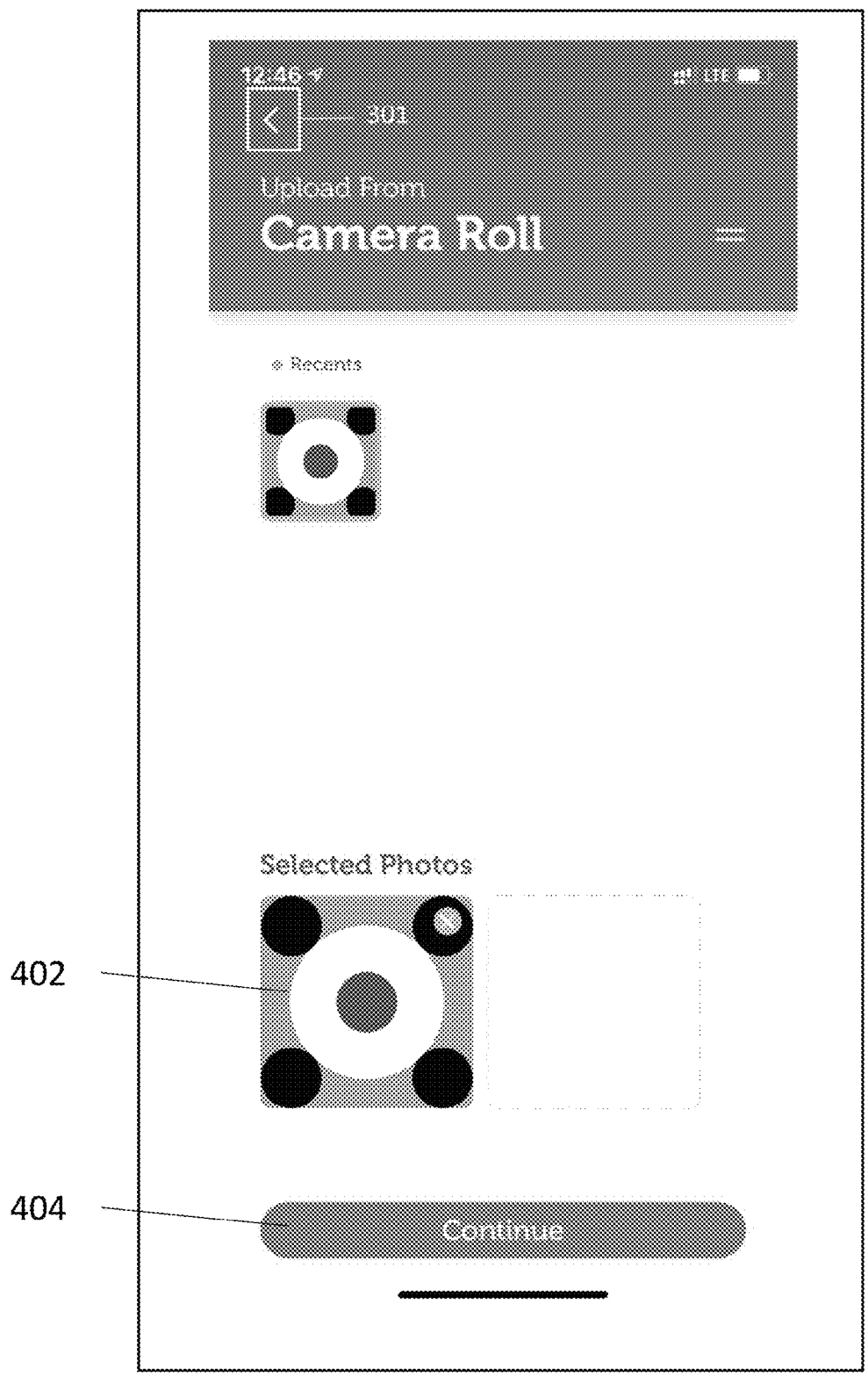
Figure 5:
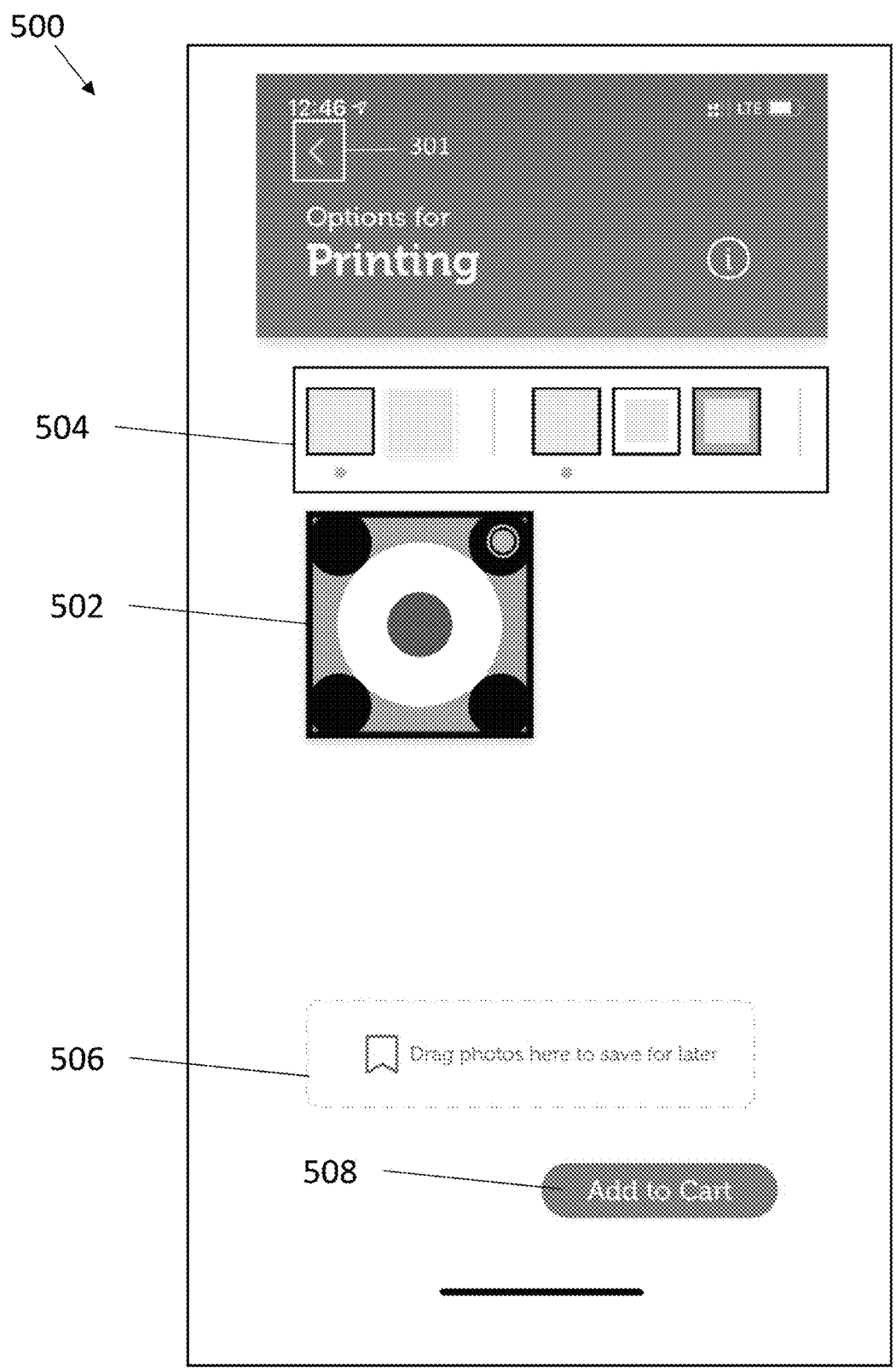

FIGS. 3-5 illustrate example graphical user interface display screens that can be provided in accordance with an example implementation and operable on computing devices 102 and/or 104. As steps are completed, such as by making selections in the graphical user interface, automatic navigation or substantially automatic navigation (in response to one or more selections) to one or more display screens can occur for additional functionality. In accordance with one or more implementations, back button control 301 is provided in display screens that, when selected, allows the user to backtrack to a previous display screen for improved navigation.

As shown in FIG. 3, options for uploading images from a "camera roll," which include images that have been captured by a camera configured with a smartphone or other user computing device 102/104, is provided. Alternatively, or in addition, images can be accessed that are stored on the same or a different computing device or service 102/104, such as FACEBOOK or INSTAGRAM. In one or more implementations of the present disclosure, a computing device 102/104 can be configured by executing instructions to provide a preview of an image that was previously taken and/or stored on the device 102/104. Alternatively, or in addition, a preview of an image can be provided substantially in real time as the image is being captured by a camera. Thereafter, the image(s) can be selected for inclusion in a graphical user interface for further processing, such as shown and described herein. In FIG. 3, for example, a thumbnail view 302 of an image, as known in the art, that has been processed recently in accordance with the teachings herein can be selected for further image processing.

FIG. 4 illustrates a graphical user interface display screen that includes a selection of the image shown in the thumbnail view 302 (including with a boundary around the thumbnail image 302) and another larger thumbnail view of the image in selected photos section 402. The larger thumbnail view of the image in selected photos section 402 can represent that one respective image that has been selected for further processing. After the user selects continue button 404, the selected image is available for processing, in accordance with the teachings herein.

FIG. 5 illustrates an example graphical user interface display screen that includes options for printing and displays the image 502 previously selected in FIGS. 3 and 4. As noted above, back button 301 is selectable here and in many graphical user interface display screens in accordance with the present disclosure for a user to return to a previous step and revise a selection. Also shown in FIG. 5 is frame style section 504, which includes options for a user to select the frame color or to select frameless, as well as to select various mat types. For example, border style section 504 includes options for no mat, a white mat, or a grey mat. Moreover, section 506 is provided, which includes a placement area where images can be placed (e.g., dragged into) for saving and future processing or, in another implementation, a placement area where images can be removed altogether. Further, images can be added to a shopping cart, for example, for future purchasing via e-commerce via add to cart control 508.

Figure 6:
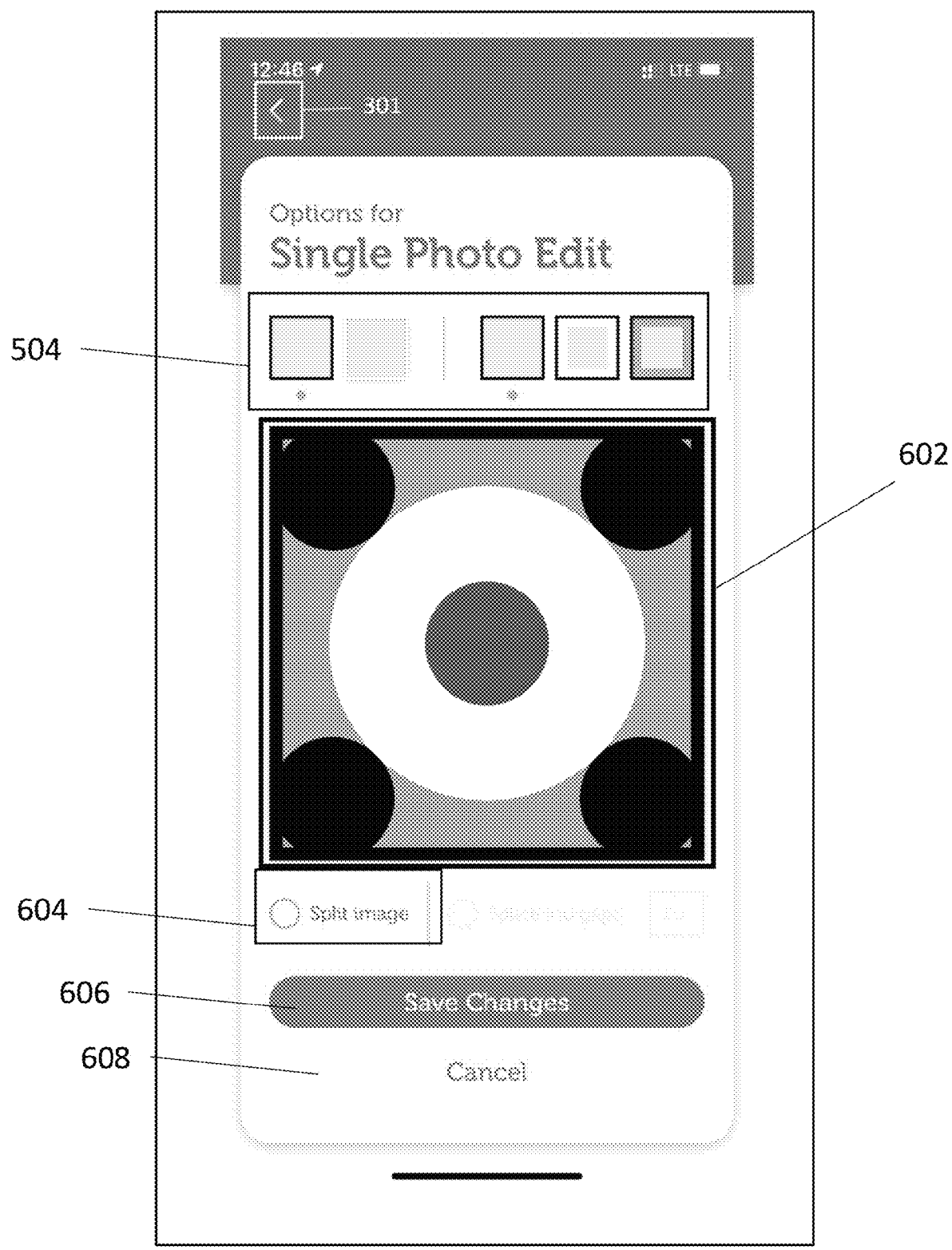
FIG. 6 illustrates an example graphical user interface display screen in accordance with implementation of the present disclosure, in which a previously selected image is provided for further editing.

FIG. 6 illustrates an example graphical user interface display screen in accordance with implementation of the present disclosure, in which the image selected in FIGS. 3 and 4 is provided for further editing. As shown in FIG. 6, frame style section 504 is included for a user to select a frame and/or a respective mat style. In addition, split image graphical screen control 604 is provided for a user to parse the selected image across a grid of multiple tiles. As shown and described herein, a graphical user interface provided in accordance with the present disclosure can display an image in image view section 602, and present updates made to the image in view section, substantially in real time, in response to selections of various controls. For example and as shown and described herein, graphical control options can be provided for a user to split an image into a number of portions (split image control 604), adjust an amount of space between each panel (space adjust control 708 (FIG. 7)), splice an image (splice no gap control 710 (FIG. 7)), adjust a zoom level of the image, or to select other options, for which options are presented in image view section 602 in response to corresponding selections. After revisions are made, for example, in response to one or more selections, the view in image view section 602 can update automatically to present the most current iteration.

Continuing with reference to FIG. 6, save changes control 606 is provided in the example screen display. When selected, save changes control 606 causes instructions to be executed by a computing device 102/104 to save the current iteration to a drive or other suitable storage device 210. Alternatively, cancel option control 608 can be selected to enable the user to discard changes that have been made. In one or more implementations, after a user selects split image control 604, options can be provided for the user to define a layout for image processing. For example, various shapes, such as squares, rectangles, diamonds, triangles, or other shapes can be provided in selectable controls (not shown). This provides the user with a starting point for image editing in accordance with the teachings herein. Other starting options can include squares or other shapes that having one or more outlines, such as black, white, shades of gray, or different colored outlines.

Figure 7:
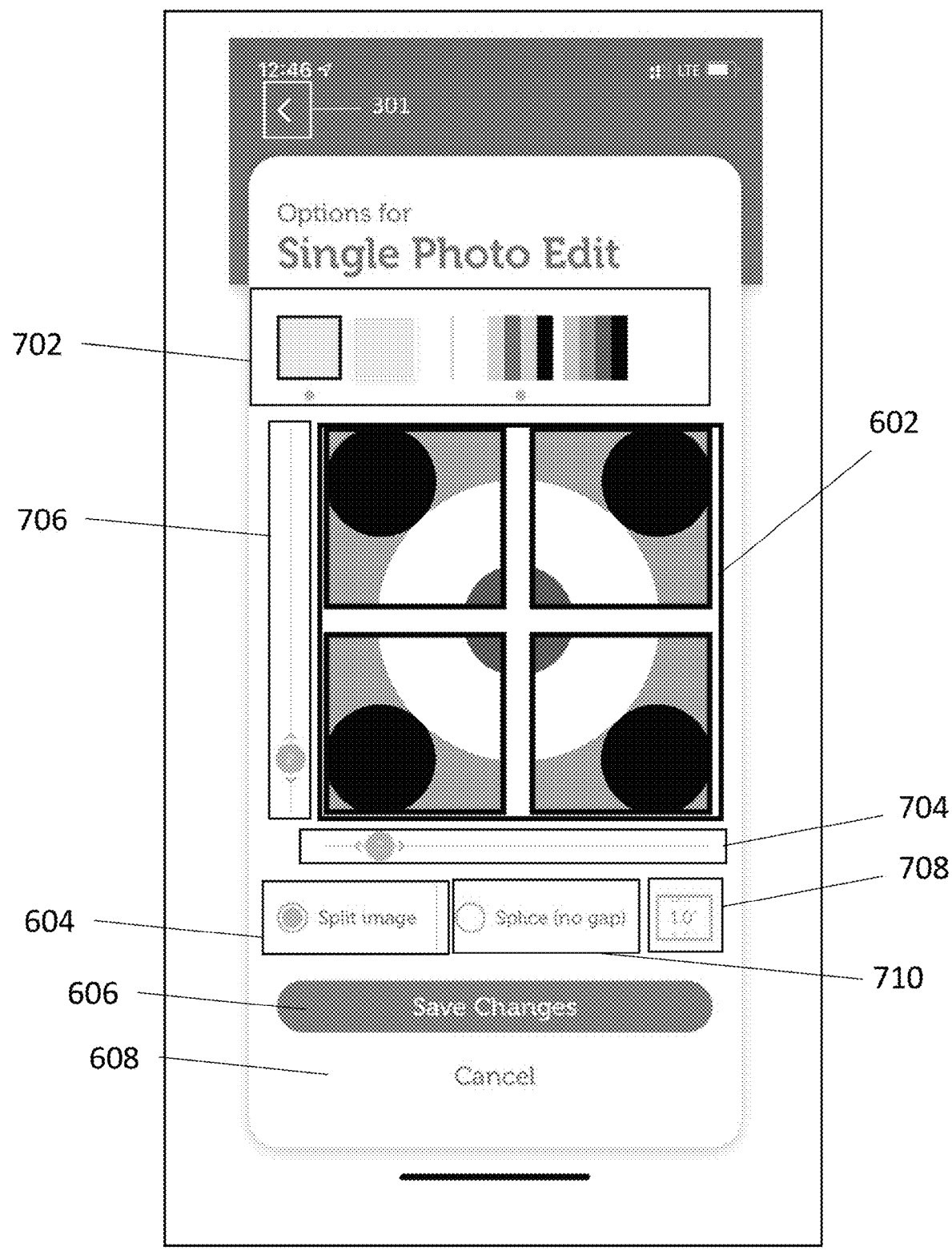
FIG. 7 illustrates an example graphical user interface display screen in accordance with an example implementation of the present disclosure.

FIG. 7 illustrates an example graphical user interface display screen in accordance with an example implementation of the present disclosure. FIG. 7 illustrates a selected image (e.g., the image previously selected in FIGS. 3 and 4), which is parsed into a 2×2 tile grid and represented in image view section 602. Border and color style section 702 is provided for a user to select whether to include a border, as described above with reference to border style section 504 (FIG. 5), as well as an option to format the selected image in color or grayscale. In the example implementation illustrated in FIG. 7, after an image is parsed and laid out in a respective shape (e.g., a square, triangle, diamond, or virtually any other shape), a series of graphical screen controls are provided for defining a respective grid for parsing the image and providing the image across a grid of multiple tiles.

Continuing with reference to FIG. 7, slider selector controls can be provided along the x-axis and y-axis, which enable a user to define a number of tiles both horizontally (x-axis slider control 704) and vertically (y-axis slider control 706). Using a slider selector control 704 and/or 706, the user can alter the layout, for example, from the 2×2 tile grid to a 3×5 tile grid, for the selected image to be provided within the selected shape (e.g., square) and parsed into three tiles vertically by five tiles horizontally.

Thus, as shown and described herein, one or more processors provided with a computing device 102/104 can execute instructions to cause the image to be edited automatically in accordance with the selected dimensions, resulting in the image being parsed automatically as defined by the respective x axis and y axis selections. As the slider controls 704 and/or 706 are moved by the user, the number of tiles in which the image is parsed increases or decreases, respectively. Such changes can be represented automatically and substantially in real time in image view section 602 as the user moves the slider selector controls, which provides an improved and intuitive interface, and improves the functioning of the computing device 102/104. Such improvements, for example, reduce the number of previously needed computing operations, provided for improved accuracy, and preclude a need for users to repeat processes otherwise caused by a lack of sufficient information and/or feedback.

Continuing with reference to the example graphical user interface display screen shown in FIG. 7, space adjust control 708 is included that, when selected, enables a user to define spacing between tiles. For example, a textbox or other graphical screen control in lieu of (or in addition to) slider selector controls can be used to enter a value (e.g., 0.5 inch) that represents an amount of space between each tile. Of course, other graphical user interface screen controls, such as scrolling values, are supported and envisioned herein. After or while a user changes values in space adjust control 708, the view of the image and tiles can be correspondingly updated and shown in image view section 602. Using such feedback, the user can make additional adjustments to the value of spacing. After a user selects the number of tiles, such as by moving the x-axis slider control 704 and/or y-axis slider control 706, the user can select save changes control 602 to save his or her settings and continue to another display screen. Alternatively, the user can use back button control 301 to discard the changes and return to a previous display screen.

Figure 8:
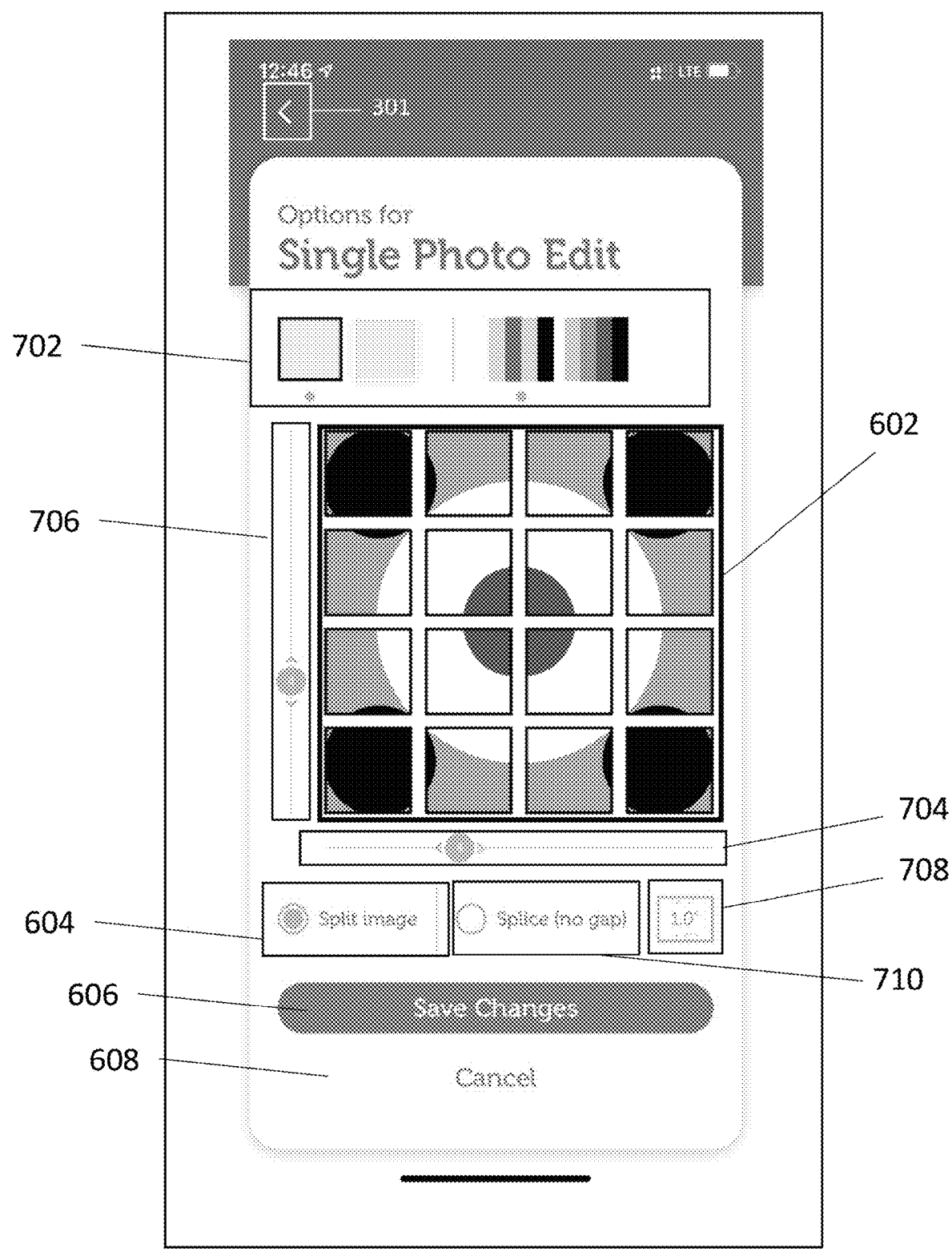
FIG. 8 illustrates an example step in a process in accordance with an implementation of the present disclosure, in which a 2×2 tile grid has been altered to a 4×4 tile grid.

FIG. 8 illustrates an example step in a process in accordance with an implementation of the present disclosure, in which the 2×2 tile grid shown in FIG. 7 has been altered to a 4×4 tile grid. In the example shown in FIG. 8, the change in grid size occurs as a function of corresponding movement of the x-axis slider control 704 and y-axis slider control 706. As shown and described herein, the updated 4×4 tile grid is displayed in image view section 602.

It is recognized herein that parsing an image to be presented in a tile format can result in an unnatural, distorted, or otherwise undesirable appearance. For example, a large portion of an image that includes a particular graphical shape, such as a cube, can appear unnatural if the cube is split to appear partially in one tile and a remaining portion of the cube to appear in one or more other respective tiles. In some cases, such as a cube, it can be preferred aesthetically to remove portions of the image that would otherwise appear in an adjacent tile. In other words, it can be preferred to physically eliminate portions of an image that would otherwise appear within the spacing between the tiles. Thus, in one or more implementations of the present disclosure, a default setting after parsing an image across a grid of multiple tiles is to eliminate portions of the image that would appear within the spacing between the tiles.

In one or more implementations, the graphical user interface provided in accordance with the present disclosure includes an option, such as a graphical screen control formatted as a radio button, push button, drop-down list, or the like that, when selected, enables or disables a split image option to remove portions of an image that would otherwise appear within spacing between tiles. In the example shown in FIGS. 7-14, 16, 19-22, 24-26, and 30-32, Splice (no gap) control 710 is provided that, when selected, results in instructions being executed that cause the computing device to adjust how the selected image is parsed and displayed in image view section 602 and, correspondingly, how the image will be output finally to a printer or other device, such as shown below with regard to FIG. 9.

Figure 9:
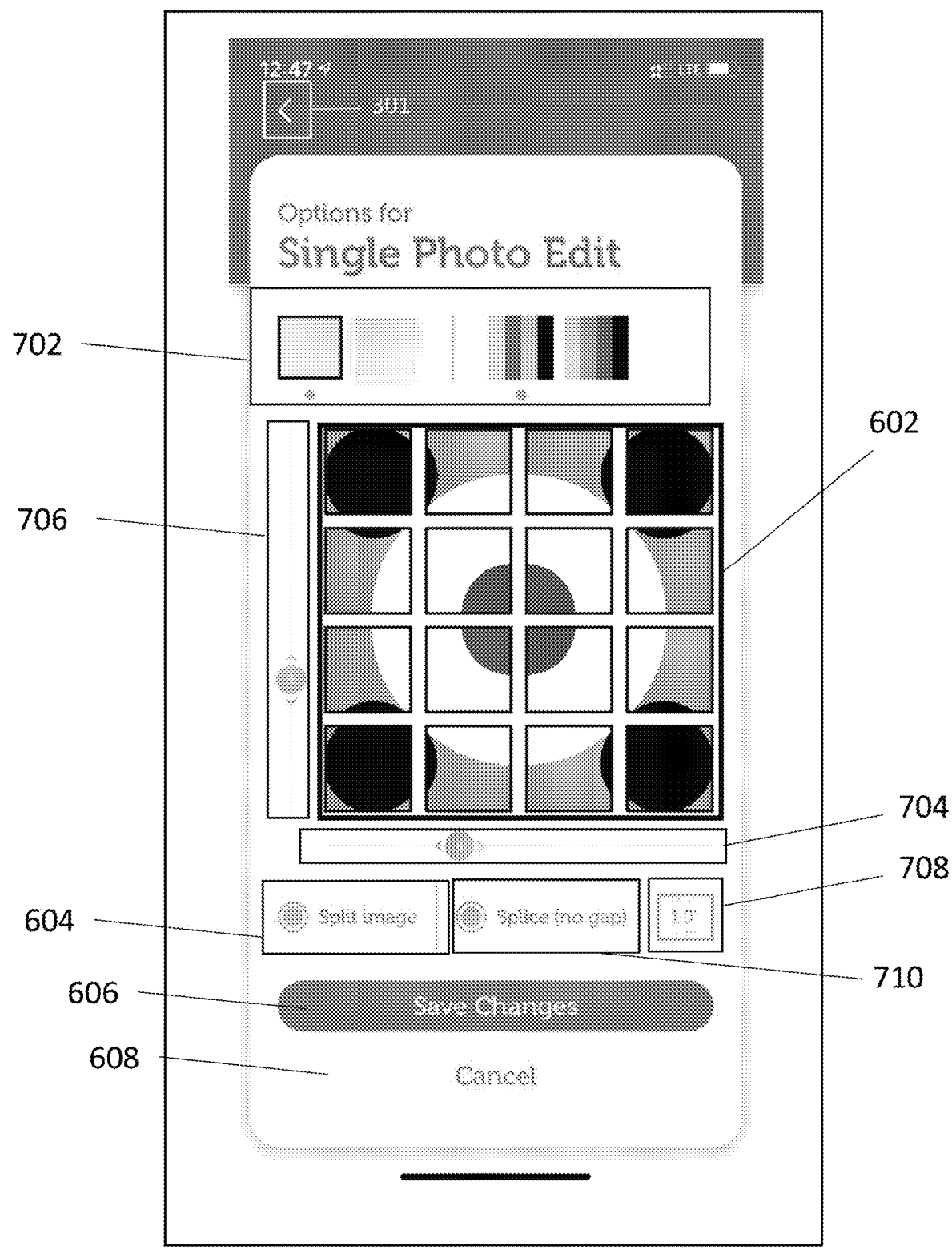
FIG. 9 illustrates an example graphical user interface display screen in which an image is parsed across a 4×4 tile grid.

FIG. 9 illustrates an example graphical user interface display screen in which an image is parsed across a 4×4 tile grid (e.g., the image from FIG. 8). In the example shown in FIG. 9, Splice (no gap) control 710 has been selected.

Moreover, it is recognized herein that stretching or cropping an image to a respective size can result in undesired effects, such as pixelation and distortion. Such effects can occur when an image is output (e.g., printed) at a size that exceeds the resolution of the image. As images are cropped, as many will be in accordance with the present disclosure in order to fit at least part of an image within a selected shape (e.g., a square), a reduction in resolution occurs since the image has been made smaller, thereby reducing the number of pixels in total. In one or more implementations, a warning can be provided in the graphical user interface to alert a user that pixelation or other possibly unwanted visual effect will occur given the respective settings that a user has chosen.

In addition to aesthetics, various selections made by user in accordance with the teachings herein, such as the number of tiles in a tile grid or the space between tiles can have a significant impact on image resolution. In an example case, each tile within a grid has a fixed size, such as 8 inches. Therefore, a 4×4 tile grid having a 1 inch spacing between each tile results in a total output size of approximately 35 inches×35 inches. A low-resolution image, such as a three megapixel image, which is cropped in accordance with the teachings herein will likely incur image degradation as a result of being printed at such a large scale. In effect, an image that is stretched across a tile grid is subject to resolution issues. Selection of the Splice (no gap) control 710 can provide a solution to a low-resolution problem. Instead of stretching the image across a tile grid, which can result in a degradation in resolution, respective portions of the image are presented in each tile.

Figure 10:
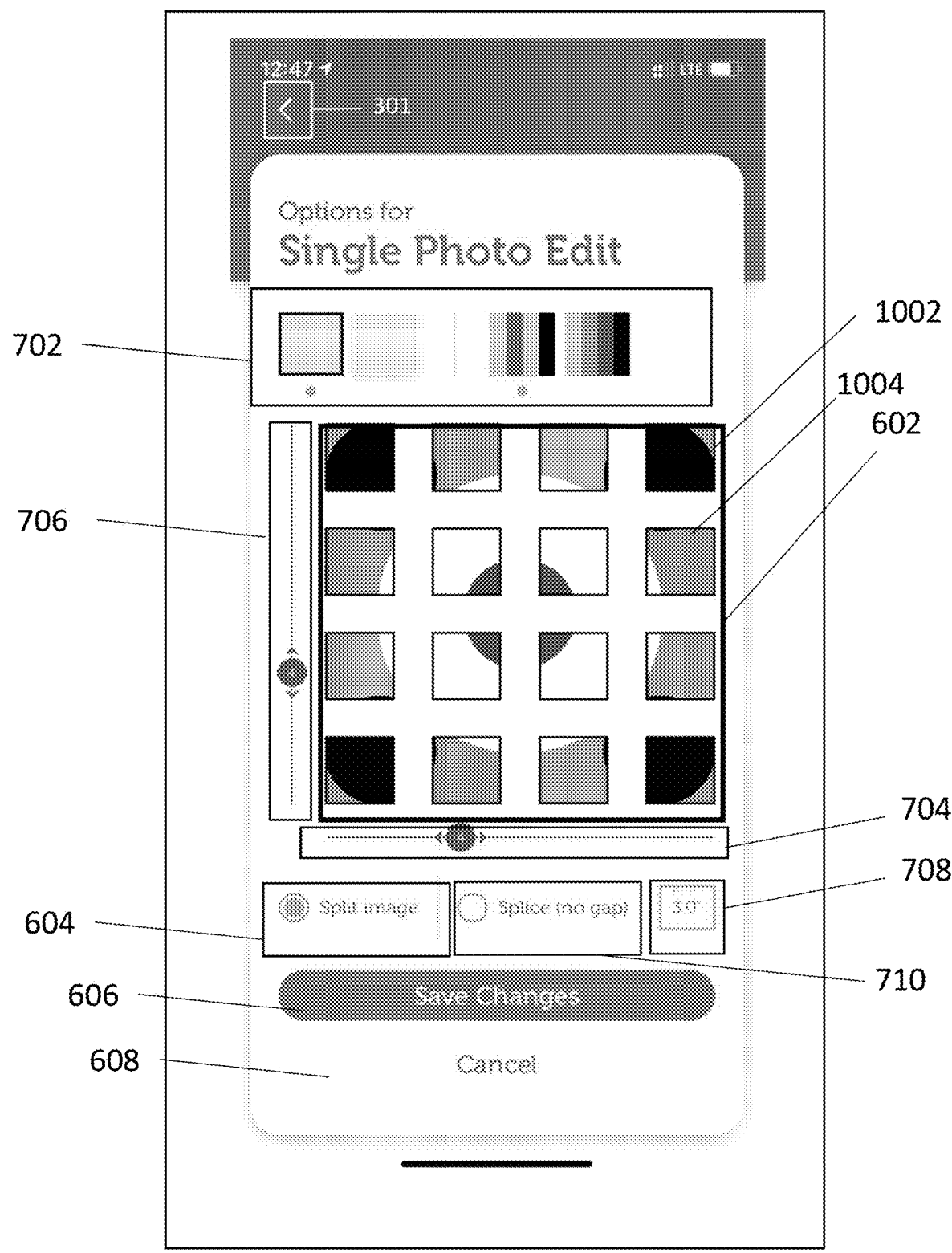
FIG. 10 illustrates an example graphical user interface display screen in which respective selections of controls result in an image being parsed across a 4×4 tile grid with 3-inch spacing between each tile.

FIG. 10 illustrates an example graphical user interface display screen in which respective selections of controls 704, 706, and 708 result in an image being parsed across a 4×4 tile grid with 3-inch spacing between each tile. This will result in image resolution being significantly degraded and a warning is provided to the user alerting the user to the likelihood thereof. In the example shown in FIG. 10, a warning is expressed by altering the color of the x-axis slider control 704 and/or the y-axis slider control 706, for example, to be formatted in the color red. This warning can prompt the user to revise his or her selections or otherwise proceed with the anticipated degradation. It is recognized herein that certain artistic features work well with pixelation or other types of degradation and can be a desired feature for the user. Other more prominent warnings, such as in dialog boxes or the like (FIGS. 15 and 23), can be provided in addition or in the alternative.

In addition to image degradation, one or more warnings (e.g., formatting slider controls in red or other color) can be provided for other reasons. For example, stretching an image from a 4×4 tile grid with a 0.5 inch spacing between each tile to a 4×4 tile grid with 3-inch spacing between each tile can eliminate portions of the image from printing. For example, and as illustrated in image display section 602 in FIG. 10, the gap between tiles 1002 and 1004 reveals a portion of the image that is missing. In one or more implementations of the present disclosure, an algorithm can be employed by a computing device 102/104 executing instructions in order to analyze a percentage or degree of an image that is removed from spacing in a tile grid. If that percentage or degree exceeds a predetermined amount or range, a warning can be provided. The warning can be formatted as one or more screen controls colored in red (or other color), by altering font or point size, or other suitable way.

For example, a predetermined value of 7% is stored in a database, which represents a threshold value defining a maximum percentage an image. As shown and described herein, one or more selections have been made in accordance with the teachings herein, such as to define the number of tiles, the amount of space between each tile, or an amount of cropping of an image. Thereafter, a computing device 102/104 determines that 9% of the image is or would be eliminated for being placed within the spaces between the tiles. As noted herein, in one or more implementations of the present disclosure, a default setting is to eliminate portions of an image that would be placed within the spaces between tiles. In response to a determination that 9% exceeds the threshold value 7%, the color of selector controls, such as x-axis slider control 704 and y-axis slider control 706, is changed automatically from orange to red, to provide an alert.

The previous example above is illustrative and it is to be recognized that many other conditions and considerations are supported by the teachings herein. For example, one or more algorithms can be employed to determine a degree of distortion that will occur to image as a function of a user selecting the Splice (no gap) control 710. In such example, a threshold value of 5% can be stored to represent a degree of image distortion or other kind of alteration. After control 710 has been selected, one or more algorithms determine as a function of image analysis that 9% of an image has been altered, which exceeds the threshold value. In response, an alert is provided, such as by changing the color of slider controls 704 and/or 706 from orange to red. Furthermore, in various implementations of the present disclosure, various threshold values (e.g., representing degrees of an image that are eliminated, distorted, or other criteria) can be submitted in the graphical user interface by users, such as via graphical screen controls (e.g., textboxes, slider controls, or other suitable controls) (not shown). Such implementations provide for greater customization by enabling users to define and submit respective threshold values without having to store such values for example in a database. In addition to a minimum or maximum value, such as a percentage, a threshold range of values can be referenced (e.g., 4-7%), to detect whether one or more adjustments result in an image being impacted beyond an acceptable amount.

Figure 11:
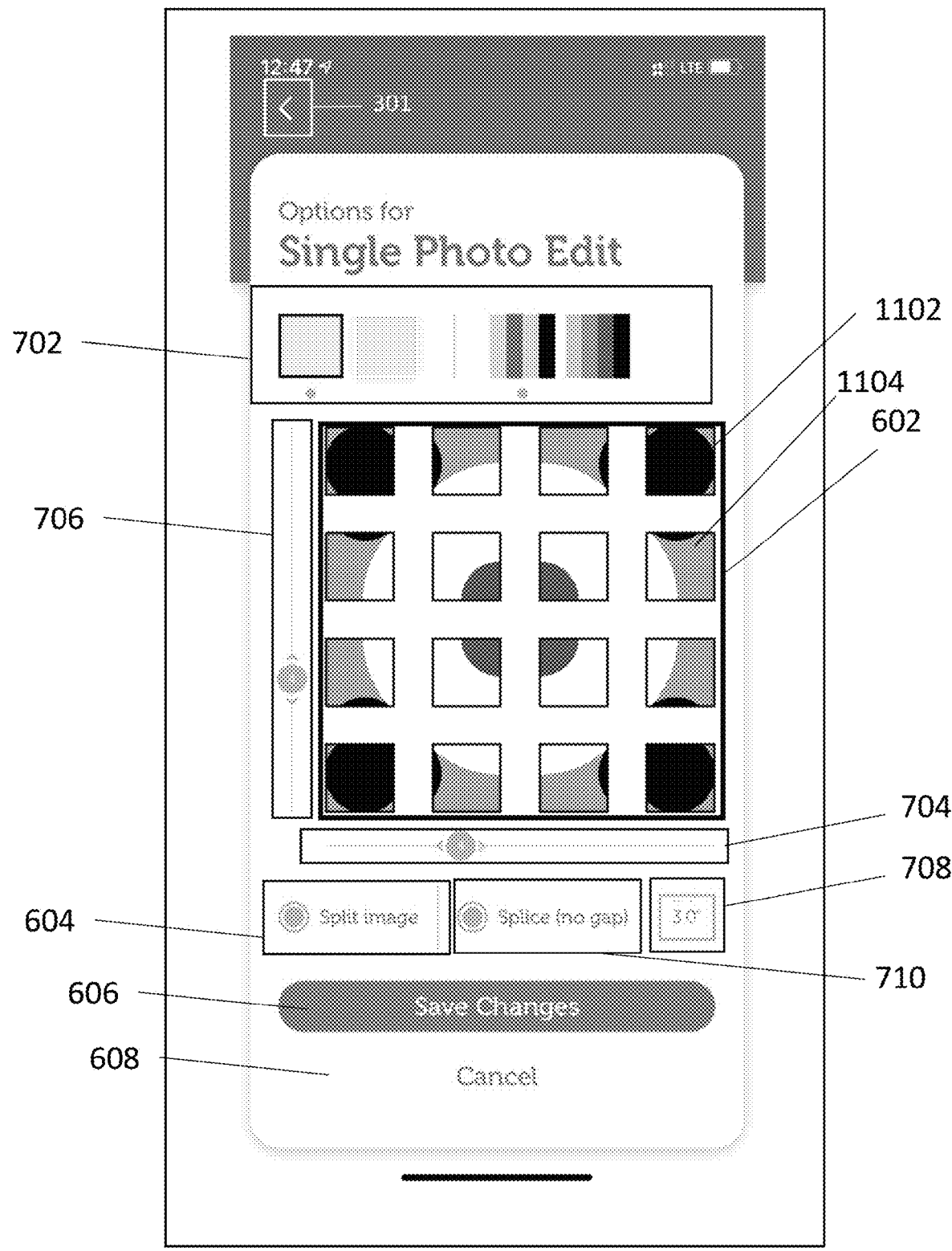
FIG. 11 illustrates an example graphical user interface display screen in which a control has been selected, resulting in the image not being stretched across the entire 4×4 tile grid with 3 inches of spacing between each tile.

FIG. 11 illustrates an example graphical user interface display screen in which the Splice (no gap) control 710 has been selected, resulting in the image not being stretched across the entire 4×4 tile grid with 3 inches of spacing between each tile. Selecting the Splice (no gap) control 710 in the example graphical user interface display screen shown in FIG. 11 eliminates the degradation in image resolution previously occurring in FIG. 10. More particularly, tiles 1102 and 1104 (FIG. 11) include the portion of the image that was missing in the gap between tiles 1002 and 1004 (FIG. 10). Also, and as illustrated in FIG. 11, the x-axis slider control 704 and y-axis slider control 706 are presented in orange color (as opposed to being presented previously in red color), in view of the image resolution or portion of the amount of the image that is eliminated as being within the predetermined threshold value or range.

Figure 12:
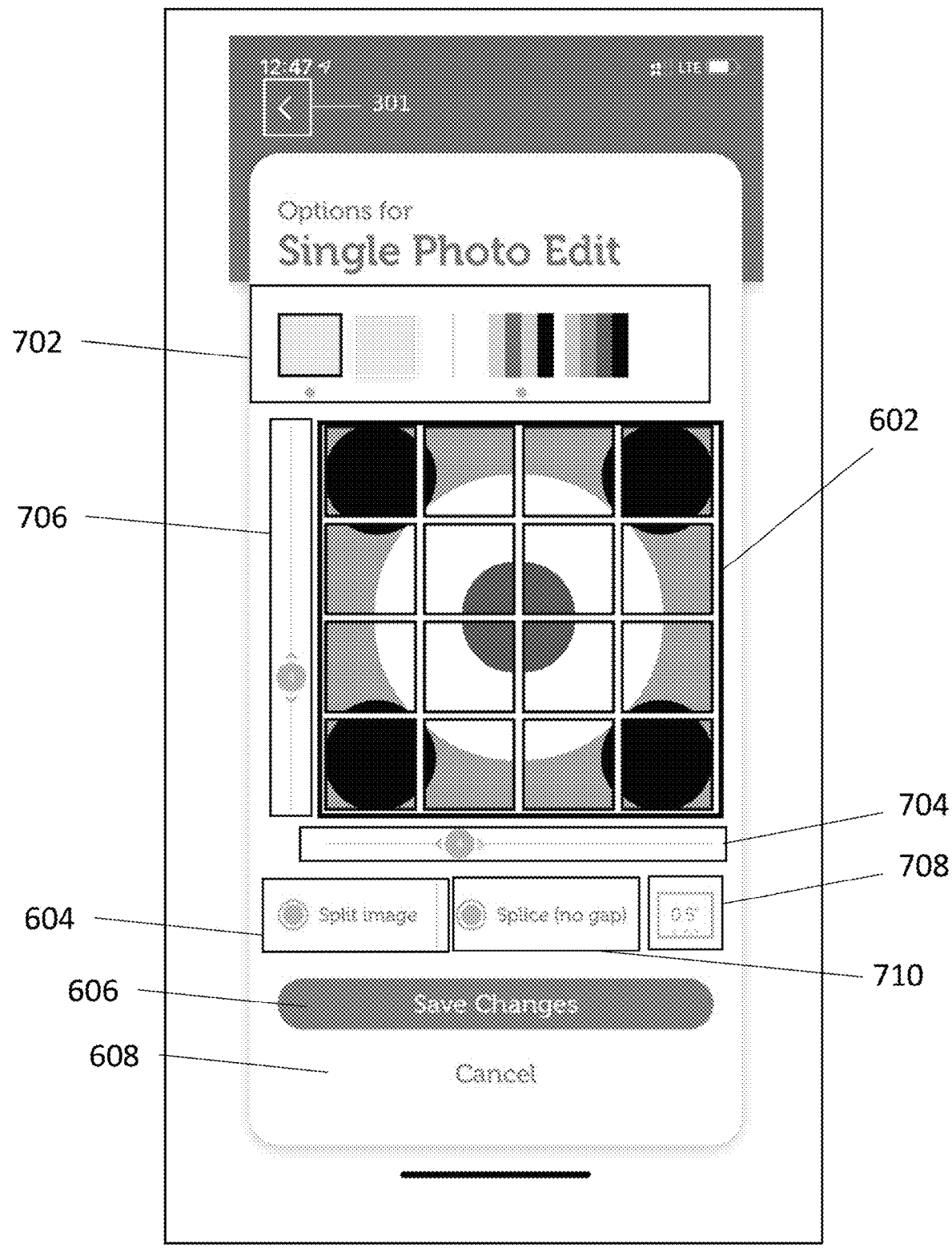
FIG. 12 illustrates an example graphical user interface display screen in which the amount of space between each tile has been reduced in the 4×4 tile grid from 3 inches to 0.5 inch.

One benefit of the features shown and described herein regards interactivity, including instant feedback provided by image view section 602 in response to selections of one or more graphical screen controls shown and described herein. For example, in FIG. 10, x-axis slider control 704 and y-axis slider control 706 are formatted in red color to alert the user of a potential issue with regard to resolution or other parameter. In FIG. 11, the Splice (no gap) control 710 has been selected, which results in the slider controls 704 and 706 being formatted in orange, representing that the image resolution or other issue has been resolved. In view of image view section 602, however, it may become apparent to a user that the distance between each tile, set at 3 inches in the examples shown in FIGS. 10 and 11, is too high. FIG. 12 illustrates an example graphical user interface display screen in which the amount of space between each tile has been reduced in the 4×4 tile grid from 3 inches (FIG. 11) to 0.5 inch (FIG. 12). Although settings shown in FIG. 11 do not result in a warning being issued for image resolution degradation (or other reason), the adjustment made to reduce the amount of space between each tile provides for a more aesthetically pleasing appearance.

Figure 13:
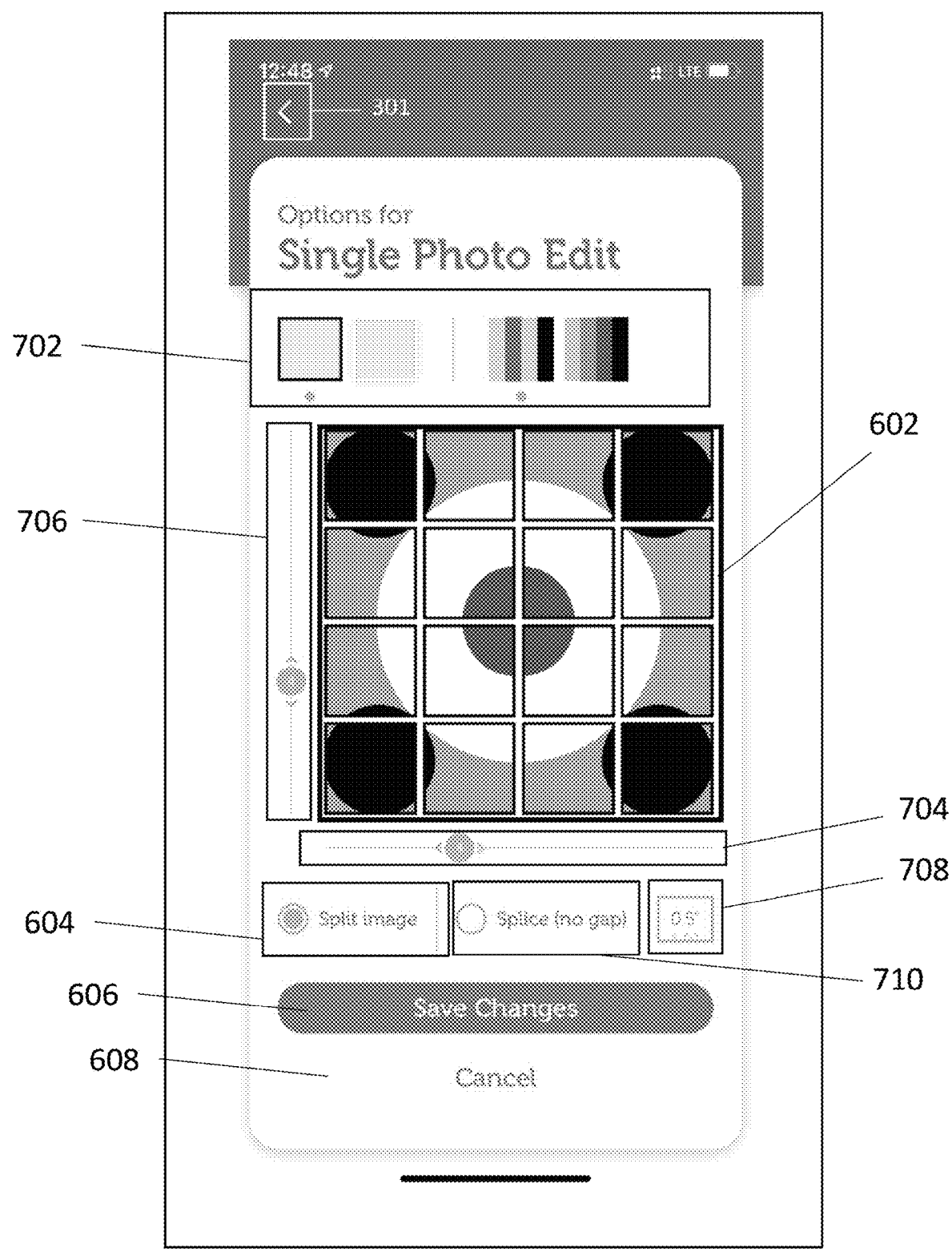
FIG. 13 illustrates an example graphical user interface display screen in which a control has been unselected, for example, based on the appearance of the layout image view.

FIG. 13 illustrates an example graphical user interface display screen in which the Splice (no gap) control 710 has been unselected, for example, based on the appearance of the layout image view section 602 in FIG. 12. For example, after reviewing the image view section 602 in FIG. 12, the user decided that the image appeared somewhat distorted as a function of the Splice (no gap) control 710 being selected. Given that the risk of degradation in image resolution is eliminated in FIG. 12, the user may have more flexibility and can unselect control 710, which results in a cleaner and un-skewed appearance of the image.

Figure 14:
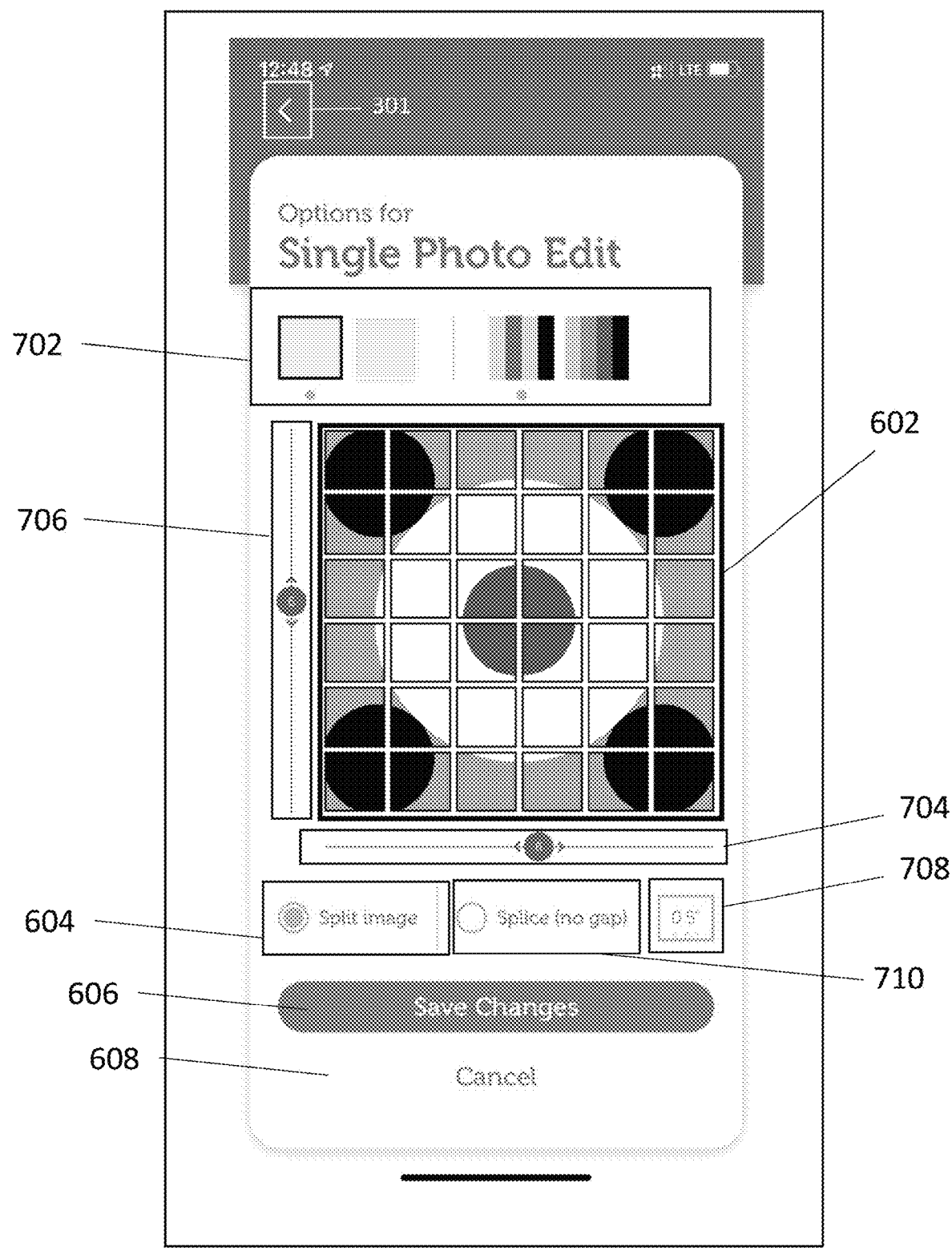
FIG. 14 illustrates another example graphical user interface display screen in accordance with an example implementation, in which settings of an x-axis slider control and y-axis slider control have defined a 6×6 tile grid.

FIG. 14 illustrates another example graphical user interface display screen in accordance with an example implementation, in which settings of the x-axis slider control 704 and y-axis slider control 706 have defined a 6×6 tile grid. This results in a potential loss in image resolution and formatting the slider controls 704 and 705 to be colored red to alert the user thereof. In addition, or in the alternative, a dialog box can appear automatically to provide a warning of low resolution.

Figure 15:
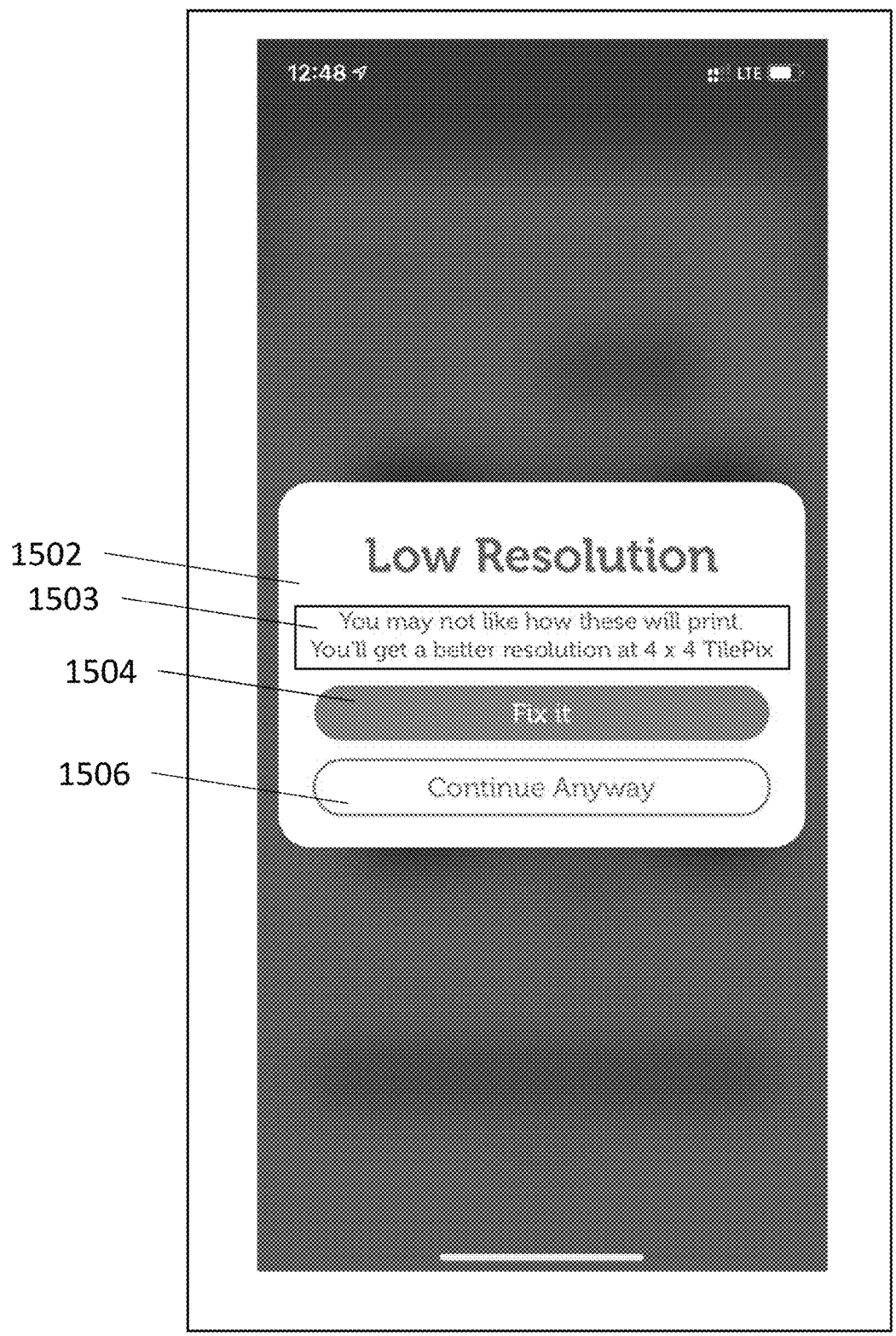
FIG. 15 illustrates an example graphical user interface display screen that displays a low-resolution warning.

FIG. 15 illustrates an example graphical user interface display screen that includes a warning displayed in an interactive dialogue box 1502, including a reason for the warning "Low Resolution." In the example shown in FIG. 15, proposed alternative setting section 1503 includes a recommended tile grid size (e.g., 4×4) that has been determined to eliminate the reason for the warning (e.g., low resolution). In addition to providing information, the example display screen shown in FIG. 15 includes Fix it control 1504 that, when selected, implements the proposed alternative settings, for example by automatically adjusting the slider controls 704 and/or 706, and/or the space adjust control 708, to revise the number of tiles in the tile grid and/or the spacing between each tile.

Figure 16:
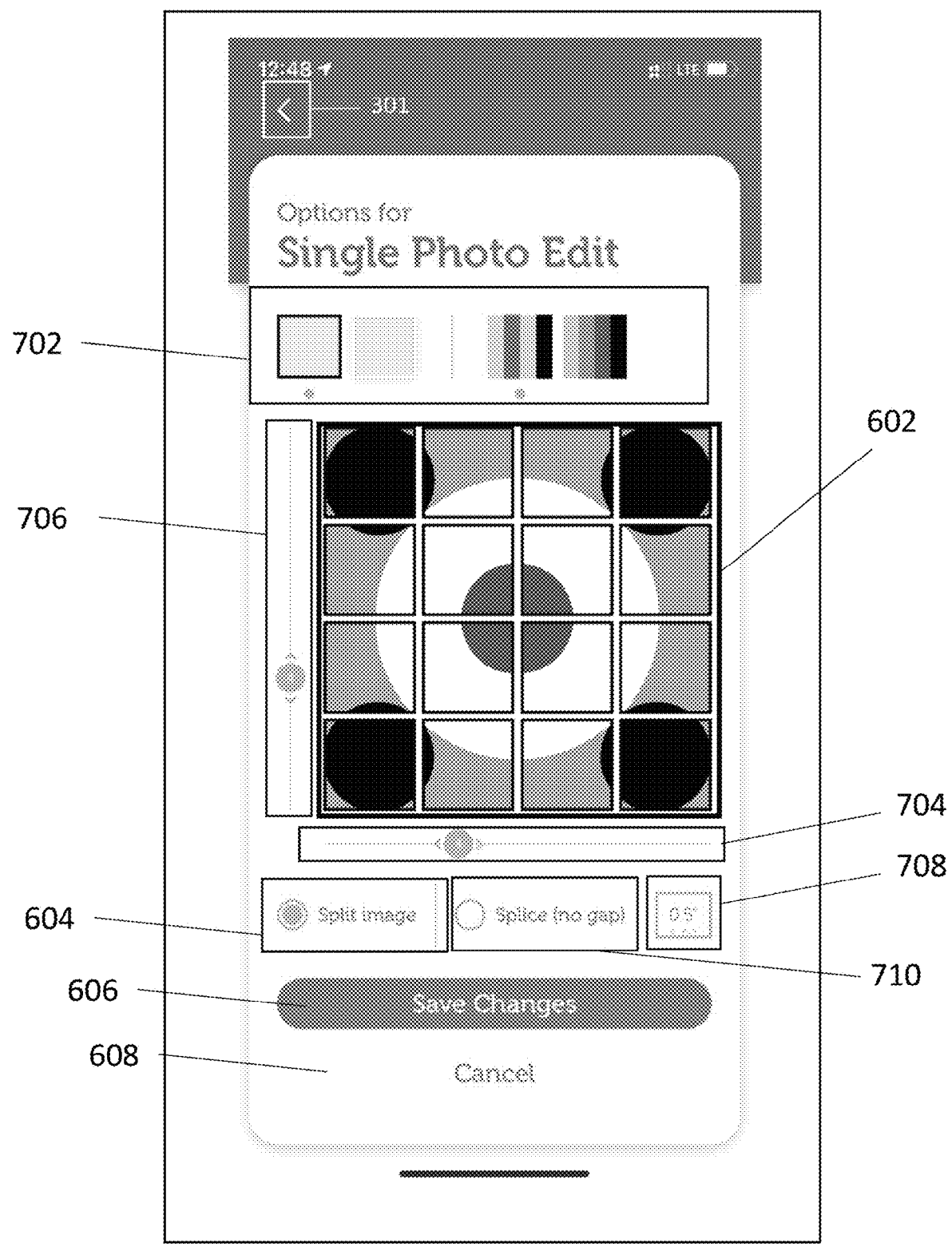
FIG. 16 illustrates an example graphical user interface display screen in accordance with an example implementation, in which an x-axis slider control and y-axis slider control have been adjusted to define a 4×4 tile grid.

FIG. 16 illustrates an example graphical user interface display screen in accordance with an example implementation. In FIG. 16, the x-axis slider control 704 and y-axis slider control 706 have been adjusted to define a 4×4 tile grid, pursuant to the proposed alternative settings set forth in section 1503 in dialogue box 1502 (FIG. 15). Alternatively, interpolation routines, as known in the art, can be applied to reduce the amount of degradation in the outputted image, without the number of tiles or the amount of spacing between each tile.

Alternatively, in the event the user elects not to have the computing device implement the proposed alternative settings set forth in dialogue box 1502, Continue Anyway control 1506 can be selected to cause the previously made selections (e.g., 6×6 tile grid defined in FIG. 14) to remain intact.

In one or more implementations, a user is provided with one or more tools to select the image, such as by clicking and dragging with a mouse or other selection device, or simply by using his or her finger on a touchscreen display. These and other related techniques enable the user to slide at least portions of the image in and out of a region associated with the shape (e.g., in and out of the square) and/or a respectively defined tile grid. In addition, the user can resize the images (e.g., via pinch-to-zoom or other suitable technique) to fit as much or as little of the original image within the selected shape as possible and/or desired. Thereafter, the user can select an option formatted as a graphical screen control, such as a button or other option, to view just the portion of the image provided in the selected shape. The user can, thereafter, proceed with additional options for functionality, as shown and described herein.

In one or more implementations of the present disclosure, a graphical user interface can change operational modes, such as in response to a user pressing and holding in a display screen for a period of time, such as for three seconds. Such action can cause one or more instructions to execute to place the interface in a different mode (e.g., referred to herein, generally as "Touchscreen Mode"), for example, to enable the user to perform operations on an image or respective parts thereof. In the examples shown in FIGS. 17 and 18, the interface is operating in touchscreen mode, and the user has zoomed into the image and dragging the zoomed-in image around in the interface. In one or more implementations, the graphical user interface can resume a previous operational mode, for example, by the user tapping in a display screen (e.g., as prompted in display control 1702). It is to be appreciated that one or more graphical controls (e.g., buttons) or input techniques, such as via particular swipe techniques (e.g., from top left to bottom right), are supported in one or more alternative implementations of the present disclosure. In one or more implementations, various screen controls (e.g., 704, 706, 708, and 710) can be disabled or removed from respective display screens in a graphical user interface while operating in Touchscreen Mode. Upon exiting Touchscreen Mode, various controls can be provided. This same functionality can be replicated on devices without touch screens through input controllers such as touch pads, mice, keyboards, and styluses.

Figure 17:
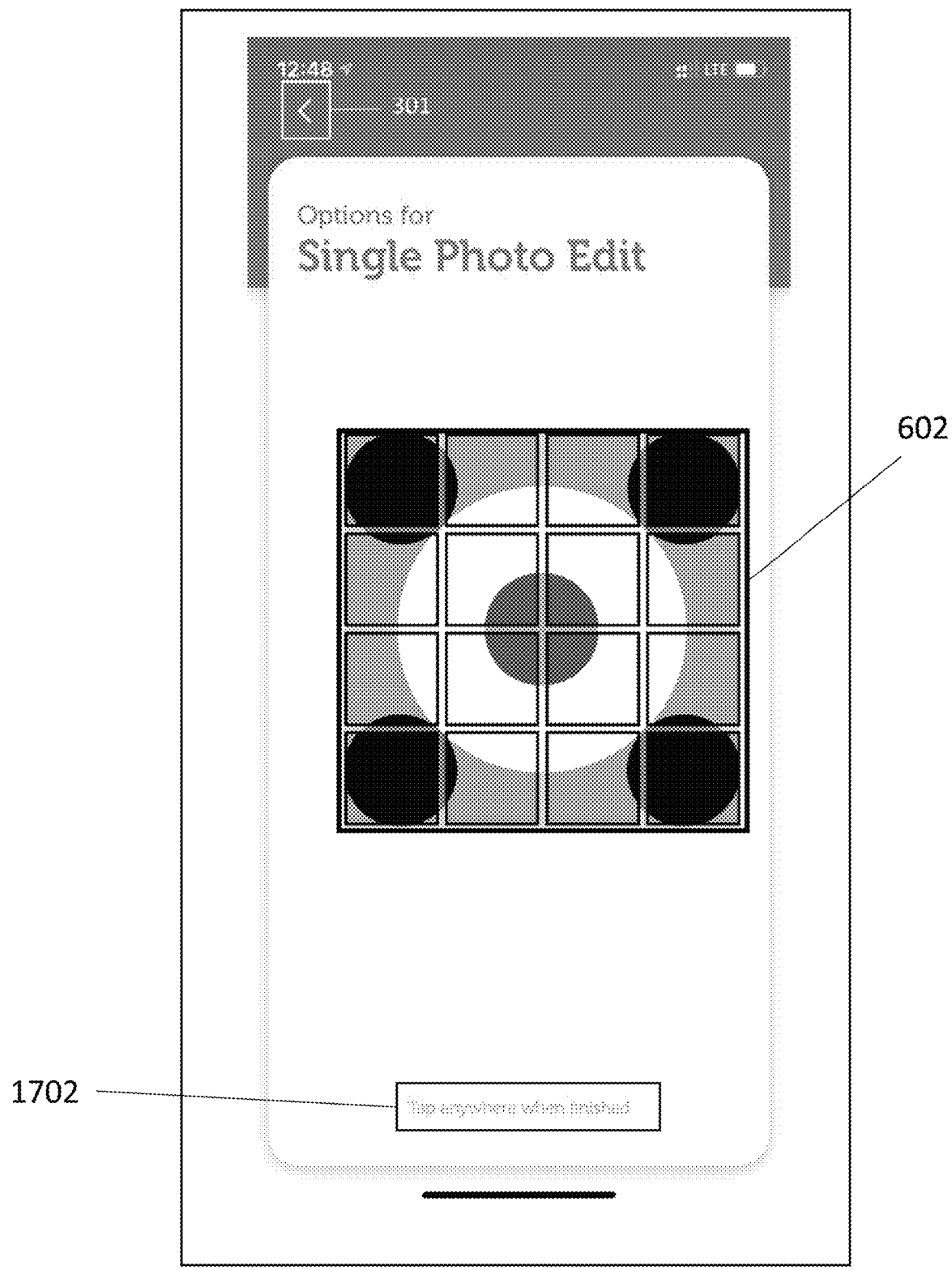
FIG. 17 illustrates an example graphical user interface display screen in accordance with an implementation of the present disclosure in which an image is set forth in a 4×4 tile grid.

FIG. 17 illustrates an example graphical user interface display screen in accordance with an implementation of the present disclosure in which an image is set forth in a 4×4 tile grid. In the graphical user interface shown in FIG. 17, no slider controls, text boxes, radio buttons, or the like are included. The user can make adjustments, such as via pinch-to-zoom or other suitable technique, and, when satisfied with the result, can tap in the screen to exit Touchscreen Mode and resume a previous operation mode, as prompted in prompt 1702. Unlike the previous example display screens shown and described herein, however, the display screen shown in FIG. 17 (and FIG. 18) do not include x-axis slider control 704, y-axis slider control 706, or space adjust control 708.

Figure 18:
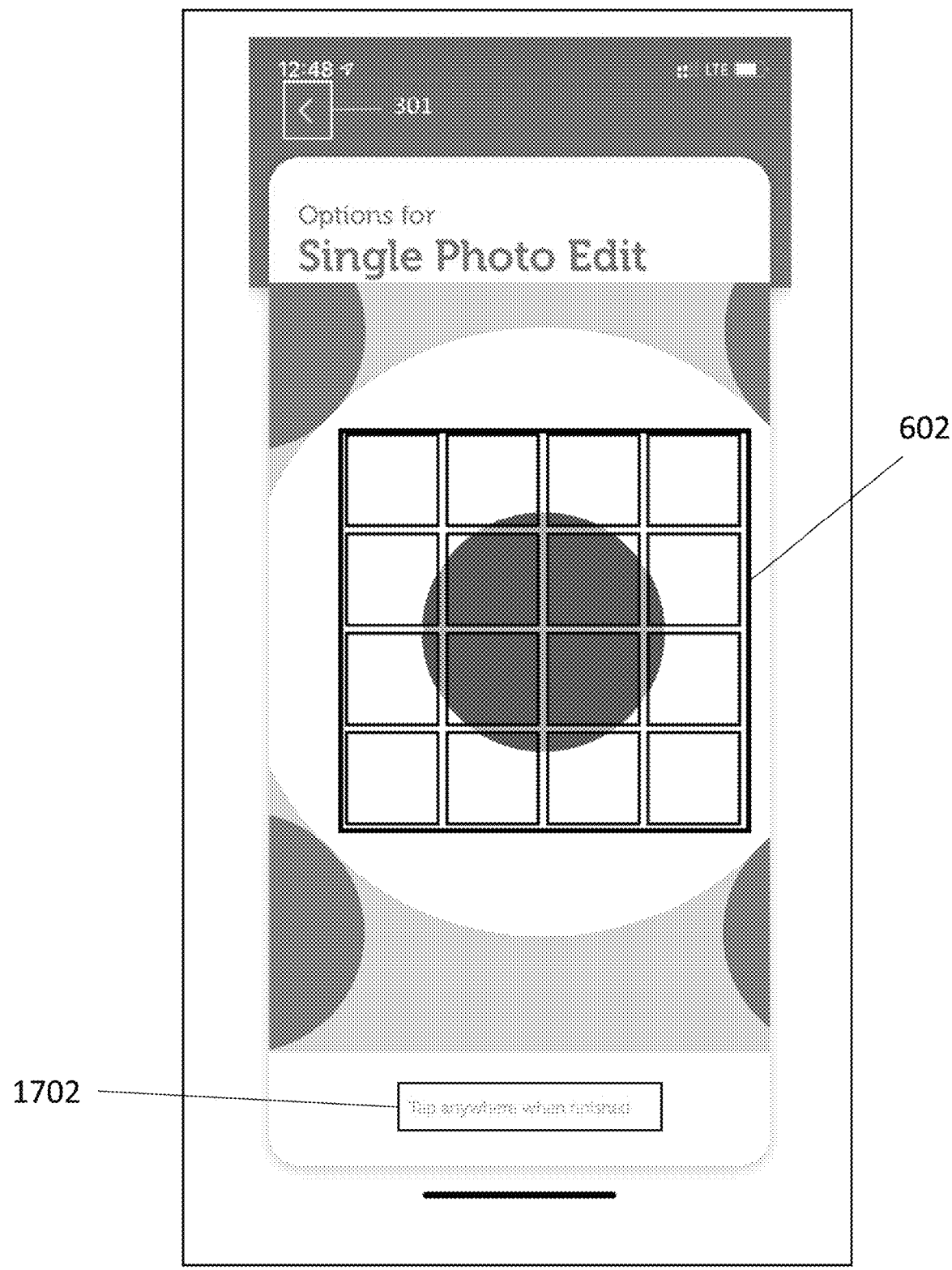
FIG. 18 illustrates an example graphical user interface display screen in accordance with an implementation of the present disclosure that shows a step in a series in which an image has been zoomed in, such as via a pinch-to-zoom technique.

FIG. 18 illustrates an example graphical user interface display screen in accordance with an implementation of the present disclosure that shows a step in a series in which the image shown in FIG. 17 has been zoomed in, such as via a pinch-to-zoom technique. The zoomed-in image is set forth in the previously defined 4×4 tile grid. In the example shown in FIG. 18, a portion of the entire image is shown inside the tile grid and formatted with no opacity. Additionally, at least a portion of the remainder of the image is shown outside of the selected shape and formatted to be shown with at least some opacity. This option enables the user to manipulate the portion and/or amount of the image that is within the selected shape.

After an image and a starting shape (e.g., a square) has been selected by the user, at least a portion of the image is displayed within the selected shape. One of ordinary skill will appreciate that image sensors (CMOS active-pixel image sensors) typically produce images having aspect ratios and sizes that are not in the form of a square, triangle, or diamond. Accordingly, an image having an aspect ratio of 1.5 to 1, for example, will not fit entirely within a square format. In one or more implementations of the present disclosure, an interface is provided in which the portion of the image which fits within the selected shape is displayed within the shape (e.g., within a square), with the remainder of the image displayed outside of the selected shape. In one or more implementations, the portion of the image that fits within the selected shape is shown with no opacity, while the portion of the image that is outside of the selected shape is shown with partial opacity. This provides a convenient and intuitive way for a user to identify the amount and portion of a selected image that will not be included in the selected shape.

Figure 19:
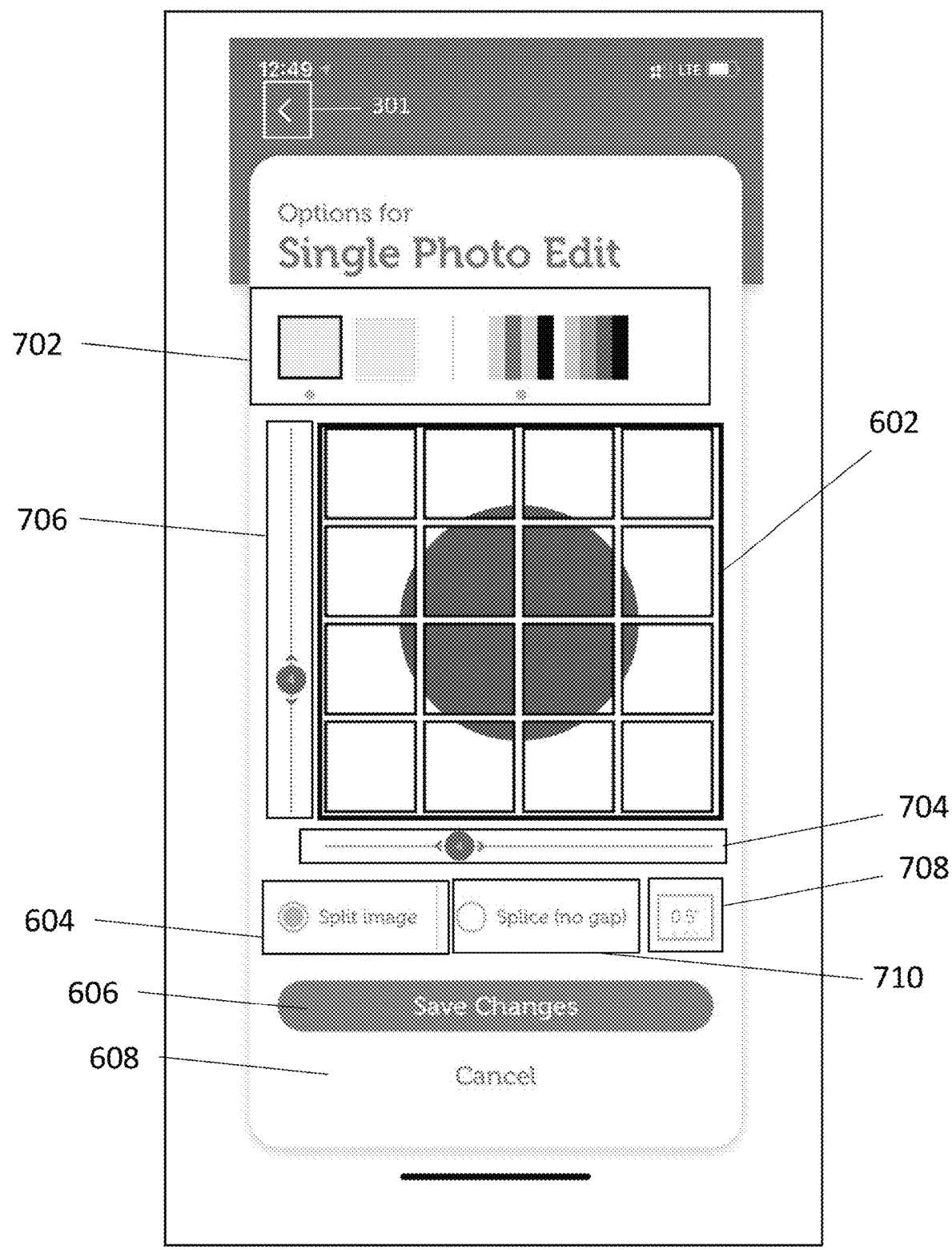
FIG. 19 illustrates an example graphical user interface display screen illustrating a step in a series after a respective control had been selected.
Figure 20:
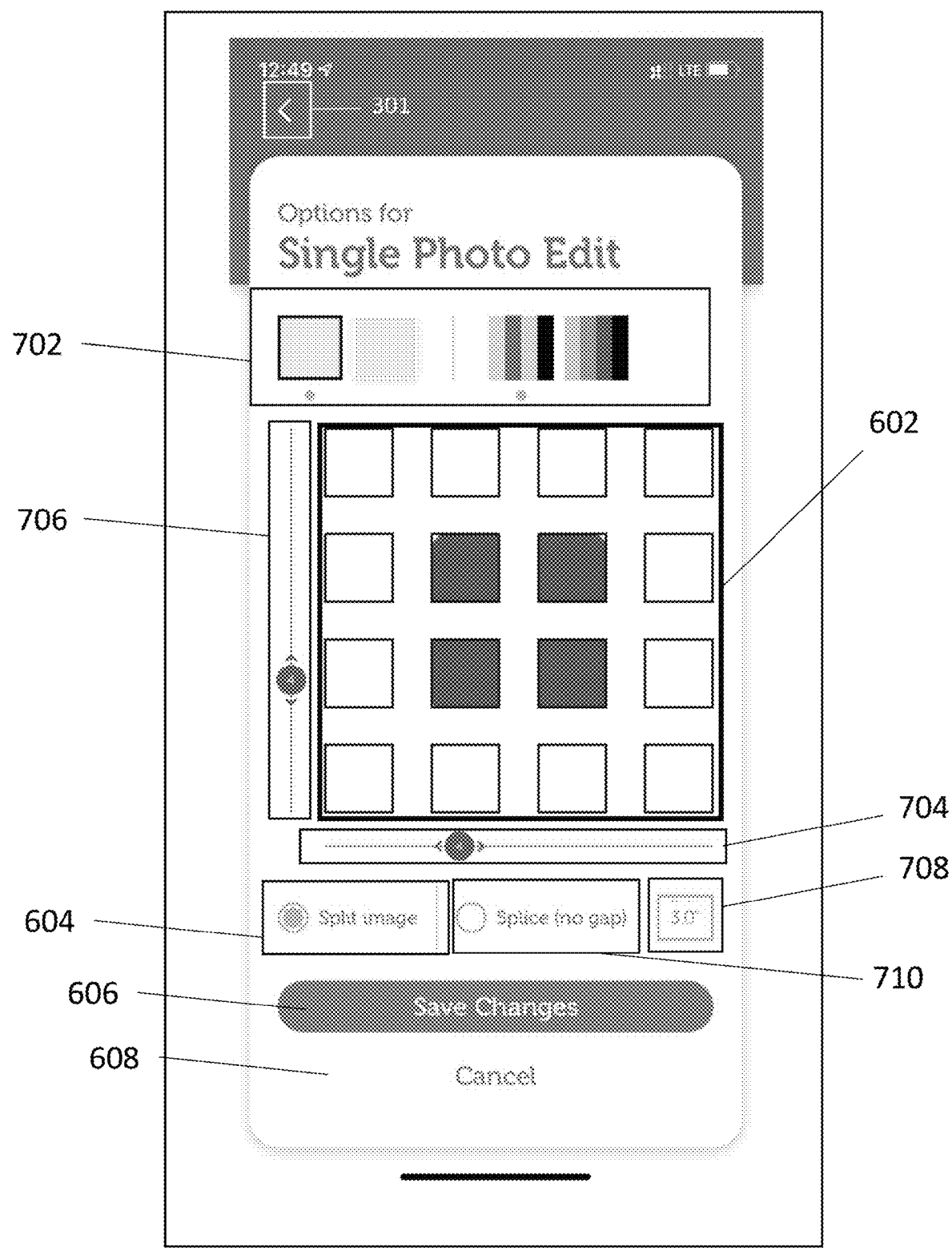
FIG. 20 illustrates an example graphical user interface display screen in which a cropped image is presented in a 4×4 tile grid, with the spacing between the tiles increased from 0.5 inch to 3 inches.

FIG. 19 illustrates an example graphical user interface display screen illustrating a step in a series after button control 1702 was selected in FIG. 18. As shown in FIG. 19, x-axis slider control 704 and y-axis slider control 706 are formatted in red color to provide an alert, such that the resolution of the image is compromised in view of the degree by which the image has been zoomed in (e.g., cropped) and set forth in a 4×4 tile grid with 0.5 inch spacing between tiles. FIG. 20 illustrates an example graphical user interface display screen in which the cropped image shown in FIG. 19 is presented in the 4×4 tile grid, with the spacing between the tiles increased from 0.5 inch (FIG. 19) to 3 inches (FIG. 20). Similar to FIG. 19, the x-axis slider control 704 and y-axis slider control 706 in FIG. 20 are formatted in the color red to provide an alert.

Figure 21:
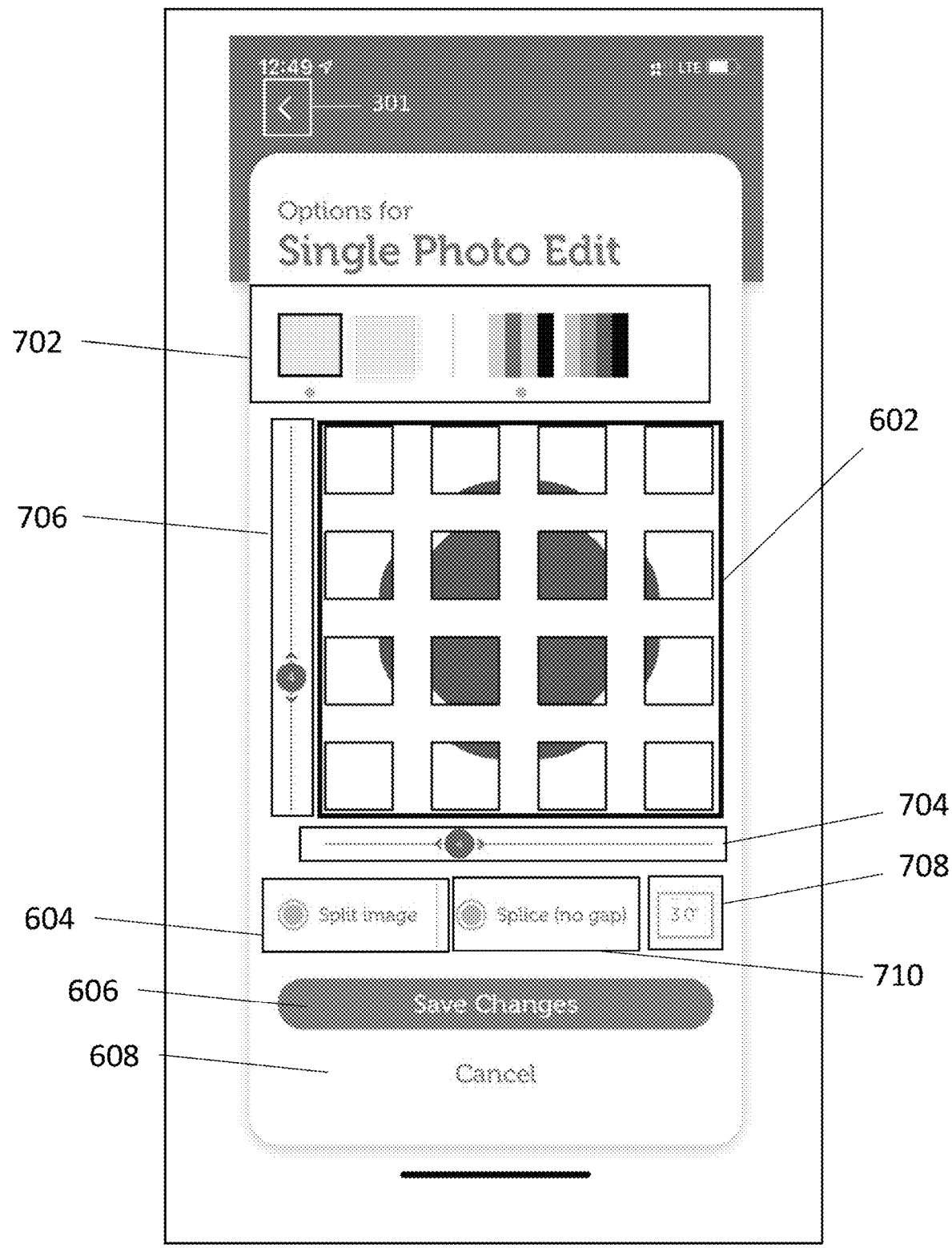
FIG. 21 illustrates an example graphical user interface display screen illustrating an additional step in a series.

FIG. 21 illustrates an example graphical user interface display screen illustrating an additional step in a series in which the Splice (no gap) control 710 has been selected. In comparison from the image shown in the image view section 602 in FIG. 20, portions of the image that were otherwise eliminated from view in the gaps between the tiles in FIG. 20 are shown in FIG. 21. As with the x-axis slider control 704 and y-axis slider control 706 in FIG. 20, the controls 704 and 706 in FIG. 21 are formatted in red color to provide a warning regarding image resolution.

Figure 22:
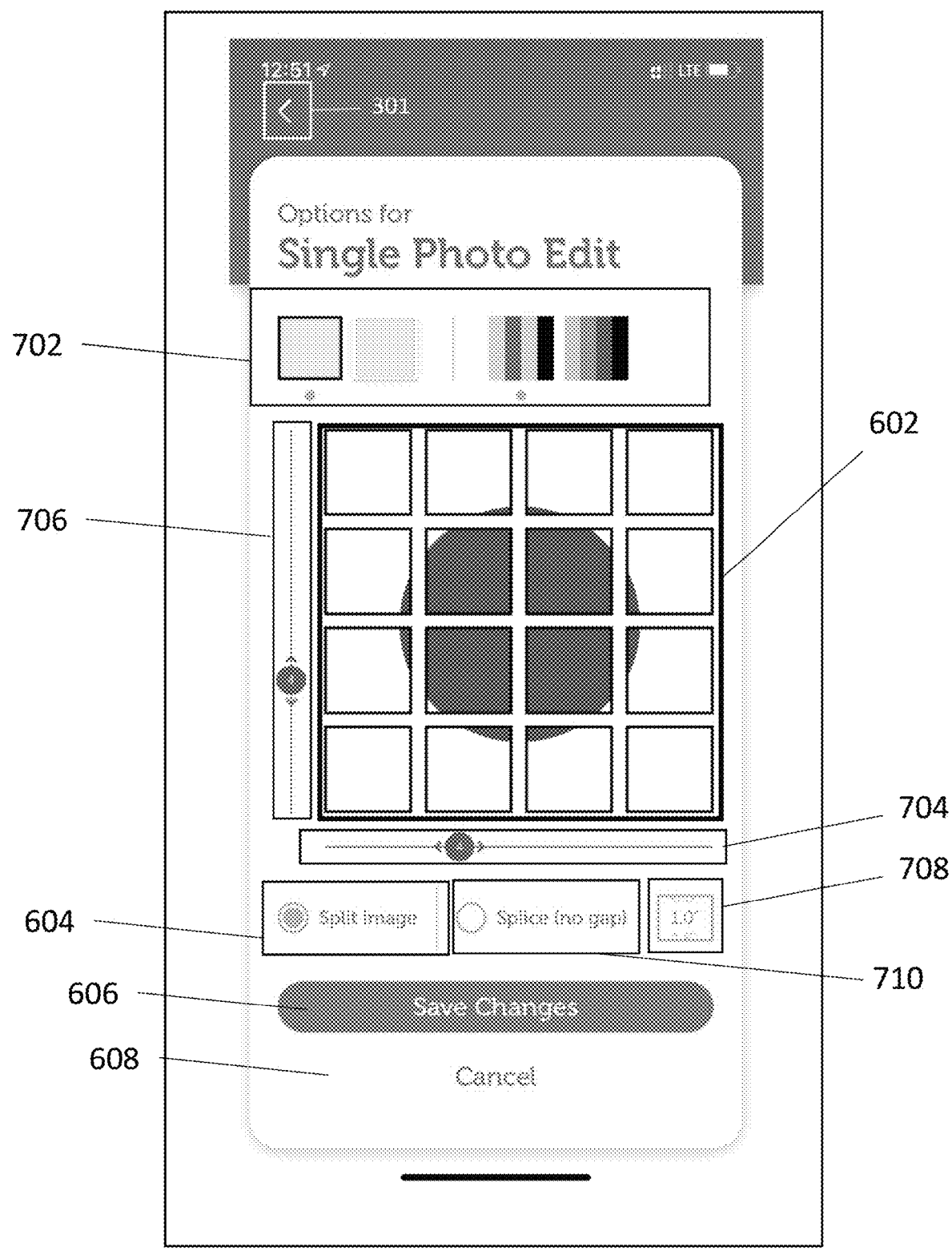
FIG. 22 illustrates an example graphical user interface display screen illustrating an additional step in a series in which a control has been unselected, in accordance with an example implementation.

FIG. 22 illustrates an example graphical user interface display screen illustrating an additional step in a series in which the Splice (no gap) control 710 has been unselected, in accordance with an example implementation. In comparison from the image shown in the image view section 602 in FIG. 20, portions of the image that were otherwise eliminated from view in the gaps between the tiles in FIG. 20 are shown in FIG. 21. As with the x-axis slider control 704 and y-axis slider control 706 in FIG. 20, the controls 704 and 706 in FIG. 21 are formatted in red color to provide a warning regarding image resolution.

Figure 23:
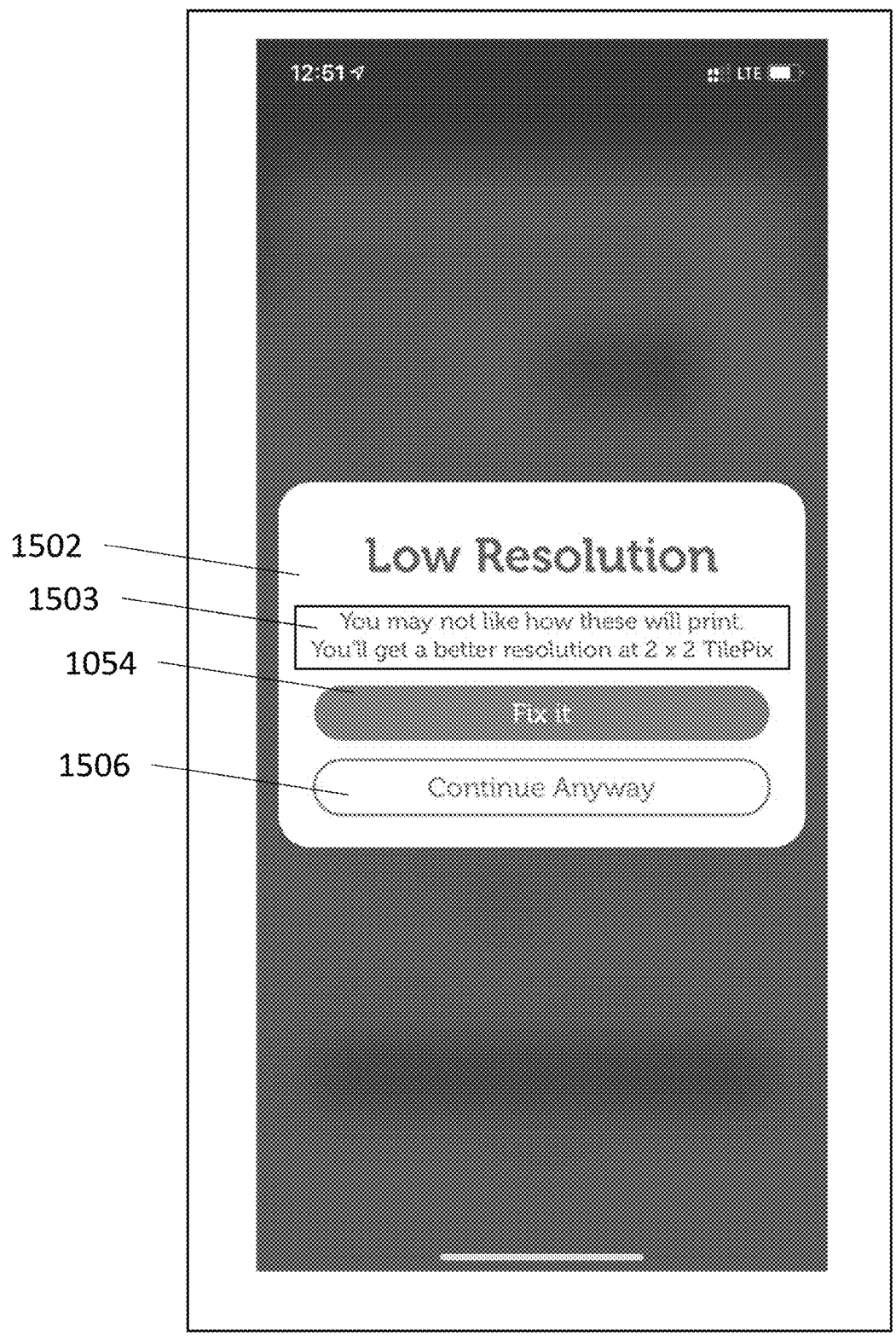
FIG. 23 illustrates an example graphical user interface display screen that includes a Low Resolution warning displayed in an interactive dialogue box.

FIG. 23 illustrates an example graphical user interface display screen that includes a warning displayed in an interactive dialogue box 1502, including a reason for the warning "Low Resolution." In the example shown in FIG. 23, proposed alternative setting section 1503 includes a recommended tile grid size (e.g., 2×2) that has been determined to eliminate the reason for the warning (e.g., low resolution). In addition to being informative, the example display screen shown in FIG. 23 includes Fix it control 1504 that, when selected, implements the proposed alternative settings, for example by automatically adjusting the slider controls 704 and/or 706, and/or the space adjust control 708, to revise the number of tiles in the tile grid and/or the spacing between each tile.

Figure 24:
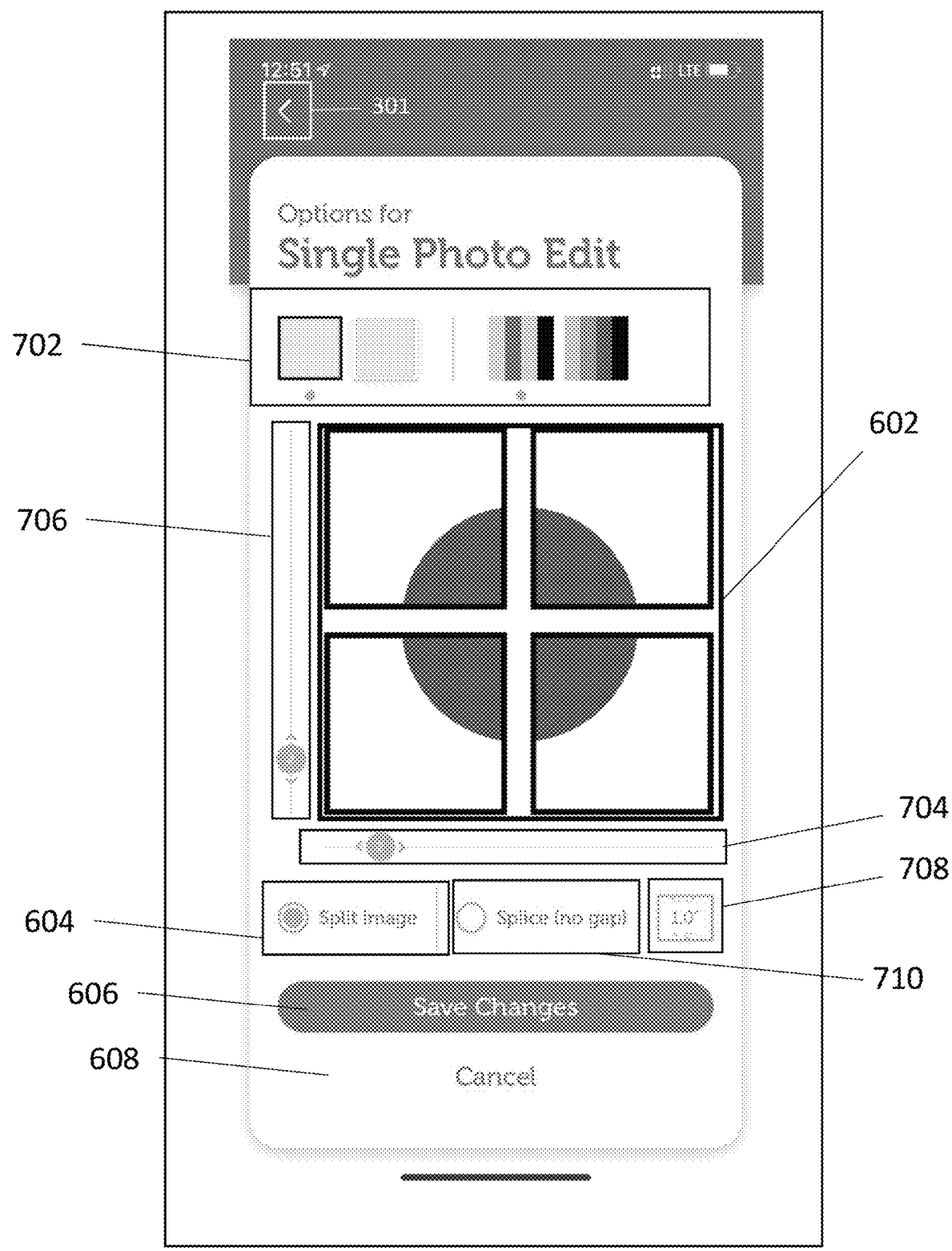
FIG. 24 illustrates an example graphical user interface display screen in accordance with an example implementation, in which the x-axis slider control and y-axis slider control have been adjusted to define a 2×2 tile grid.

FIG. 24 illustrates an example graphical user interface display screen in accordance with an example implementation, in which the x-axis slider control 704 and y-axis slider control 706 have been adjusted to define a 2×2 tile grid, pursuant to the proposed alternative settings set forth in section 1503 in dialogue box 1502 (FIG. 23).

Figure 25:
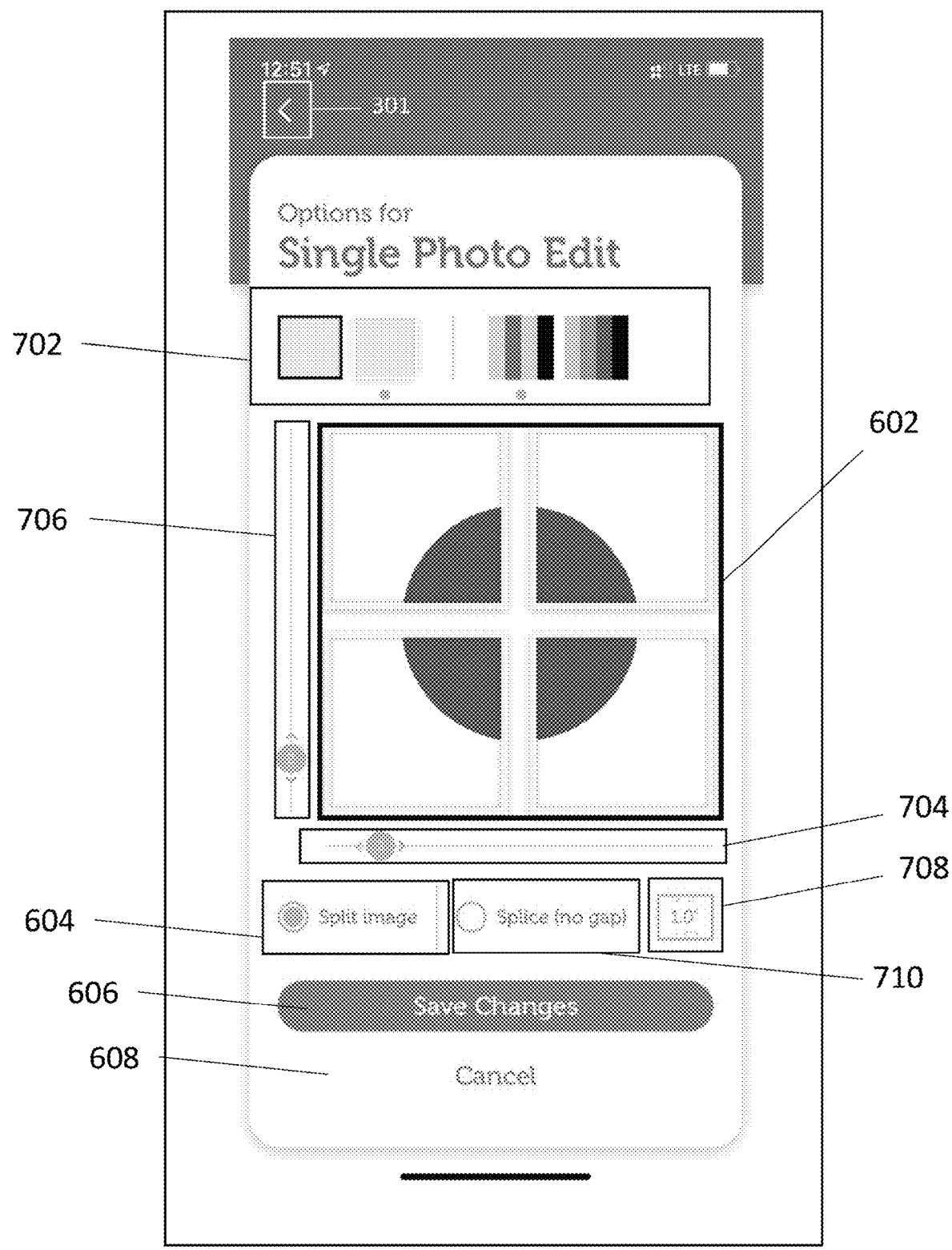
FIG. 25 illustrates an example graphical user interface display screen illustrating an additional step in a series to define no border.
Figure 26:
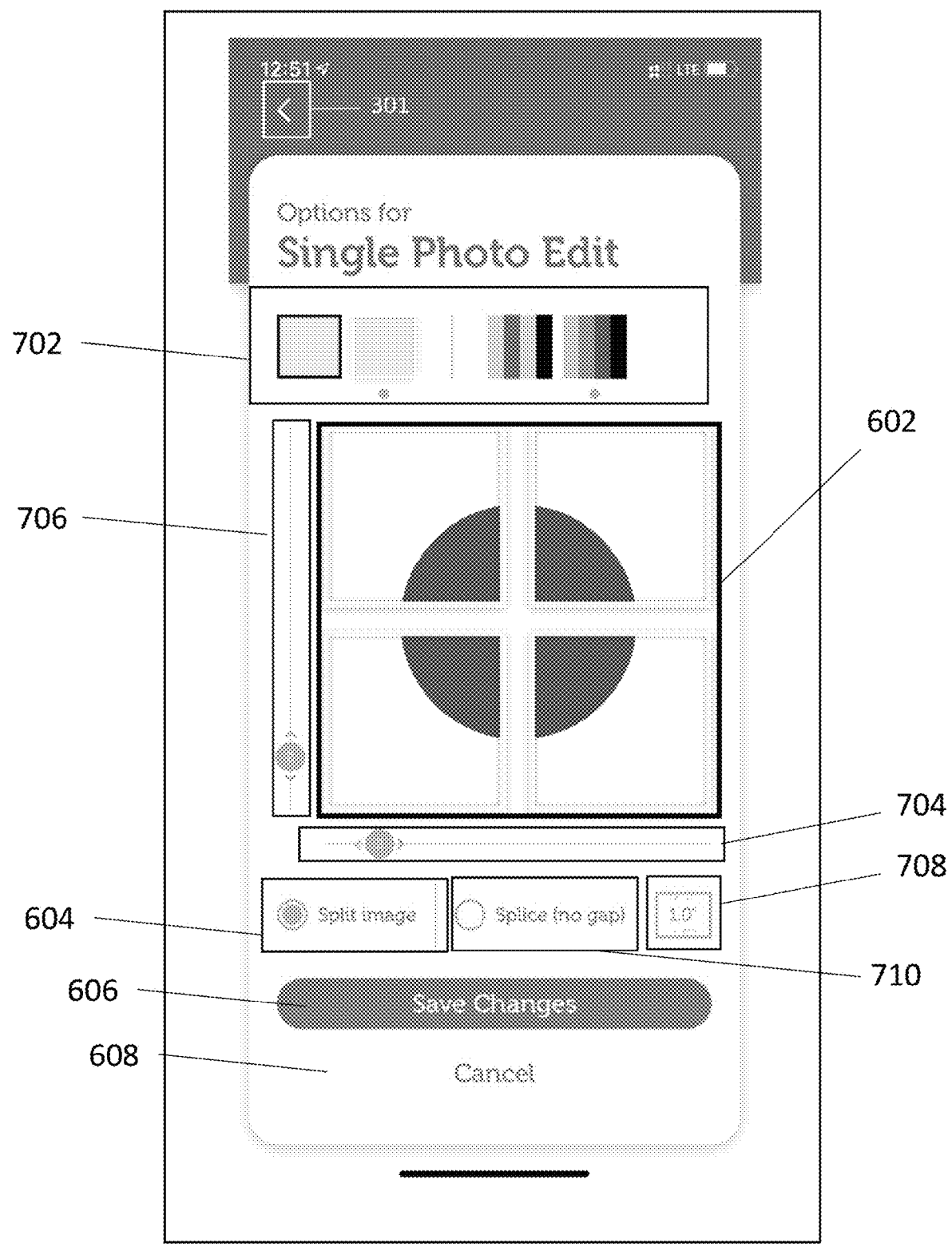
FIG. 26 illustrates an example graphical user interface display screen illustrating an additional step in a series following FIG. 24 (or FIG. 25) in which the selection in border and color style section 702 sets the image in gray scale.

FIG. 25 illustrates an example graphical user interface display screen illustrating an additional step in a series following FIG. 24 in which the selection in border and color style section 702 defines no border. FIG. 26 illustrates an example graphical user interface display screen illustrating an additional step in a series following FIG. 24 (or FIG. 25) in which the selection in border and color style section 702 sets the image in gray scale.

Figure 27:
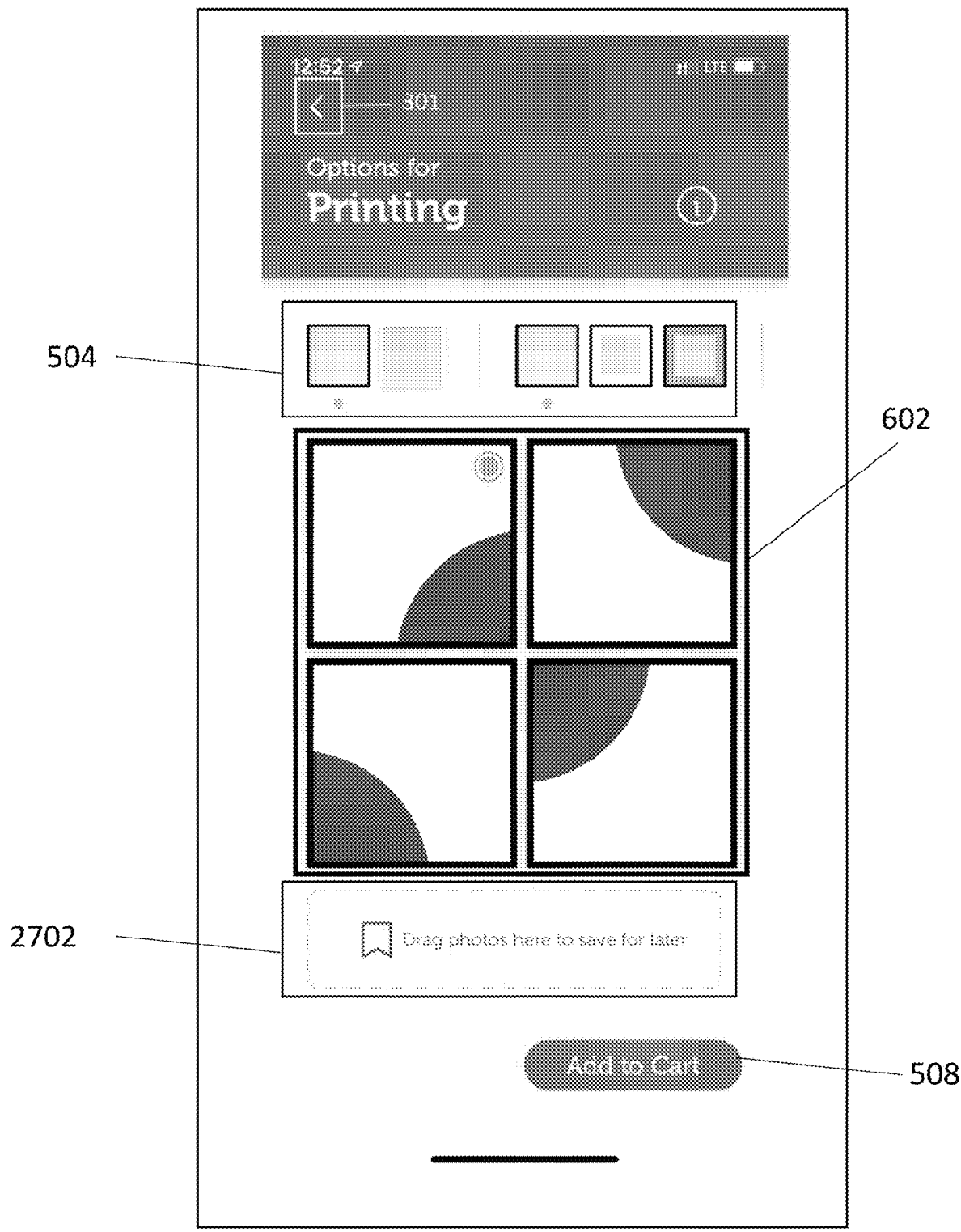
FIGS. 27 and 28 illustrate example graphical user interface display screens illustrating how the final split image appears after editing with other split and non-split images prior to purchase.

FIG. 27 illustrates example graphical user interface display screen illustrating how the photo tiles appear in a pre-shopping cart after being saved by the user, for example, following FIG. 24. The user may have split other images or may have other images (s)he also wants to have printed in the same order, all of which would appear together prior adding them to the cart for purchase. In this example, the user can select any photo or splits series to re-edit or delete prior to checkout.

Alternatively, or in addition, a user can select a plurality of images to be included in a respective tile grid. For example, rather than representing different portions of an image that were rearranged, the respective tiles shown in image view section 602 in FIG. 27 can be separate images that were included in the tile grid. The present disclosure provides for significant flexibility with respect to parsing an image across a grid of tiles, as well as editing the image, rearranging portions of the image, and inserting/removing portions or all of one or more images in a tile grid.

Figure 28:
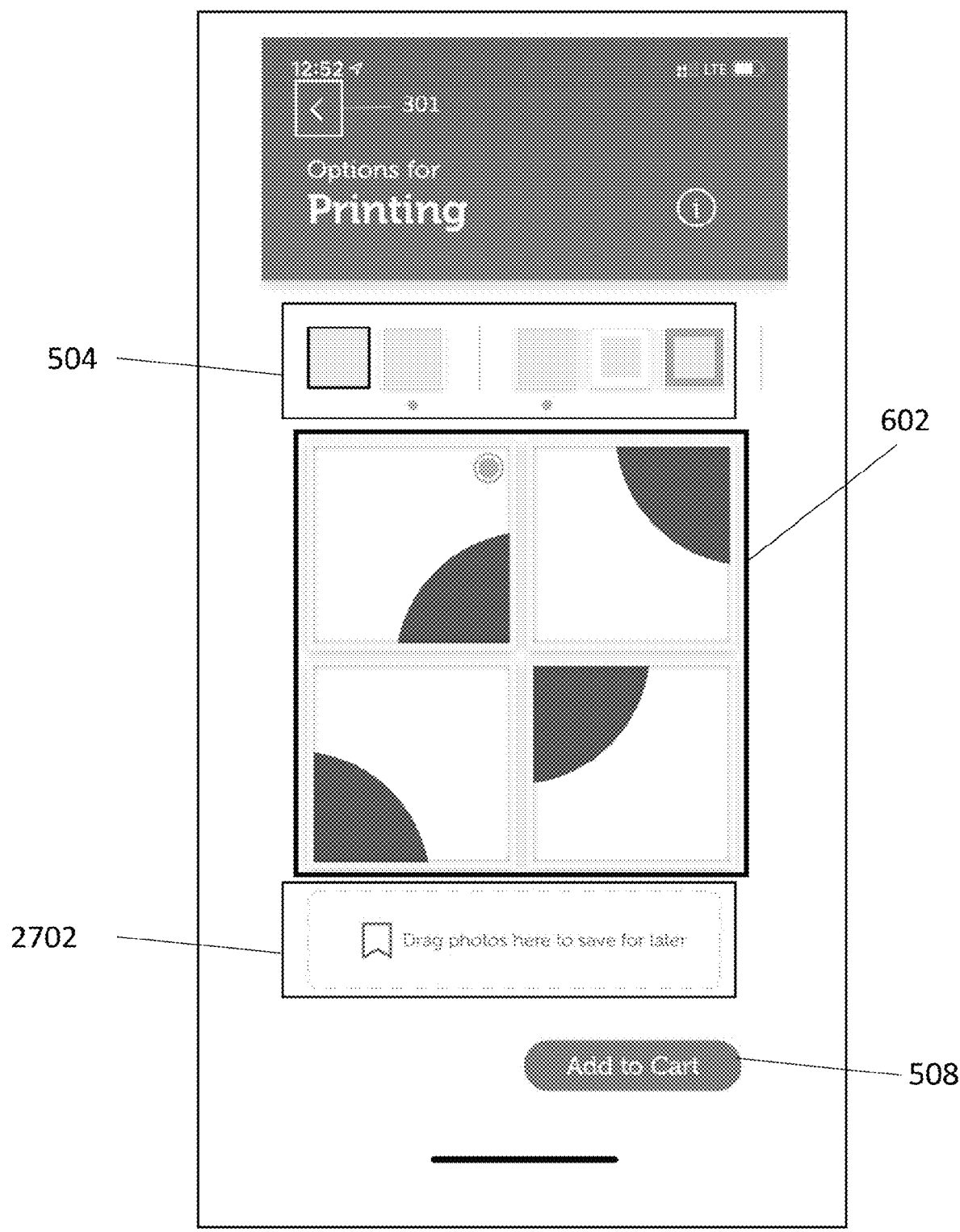

FIG. 28 illustrates the image tiles shown in FIG. 27, as having been selected for a bulk action. In the example shown in FIG. 28, a radio button has been selected, in which the selection in frame color and mat style section 504 will be applied to all selected images and defines white frames and no mat from the previously selected black frames and no mat. Accordingly, a white frame appears around the respective tiles in image view section 602.

Figure 29:
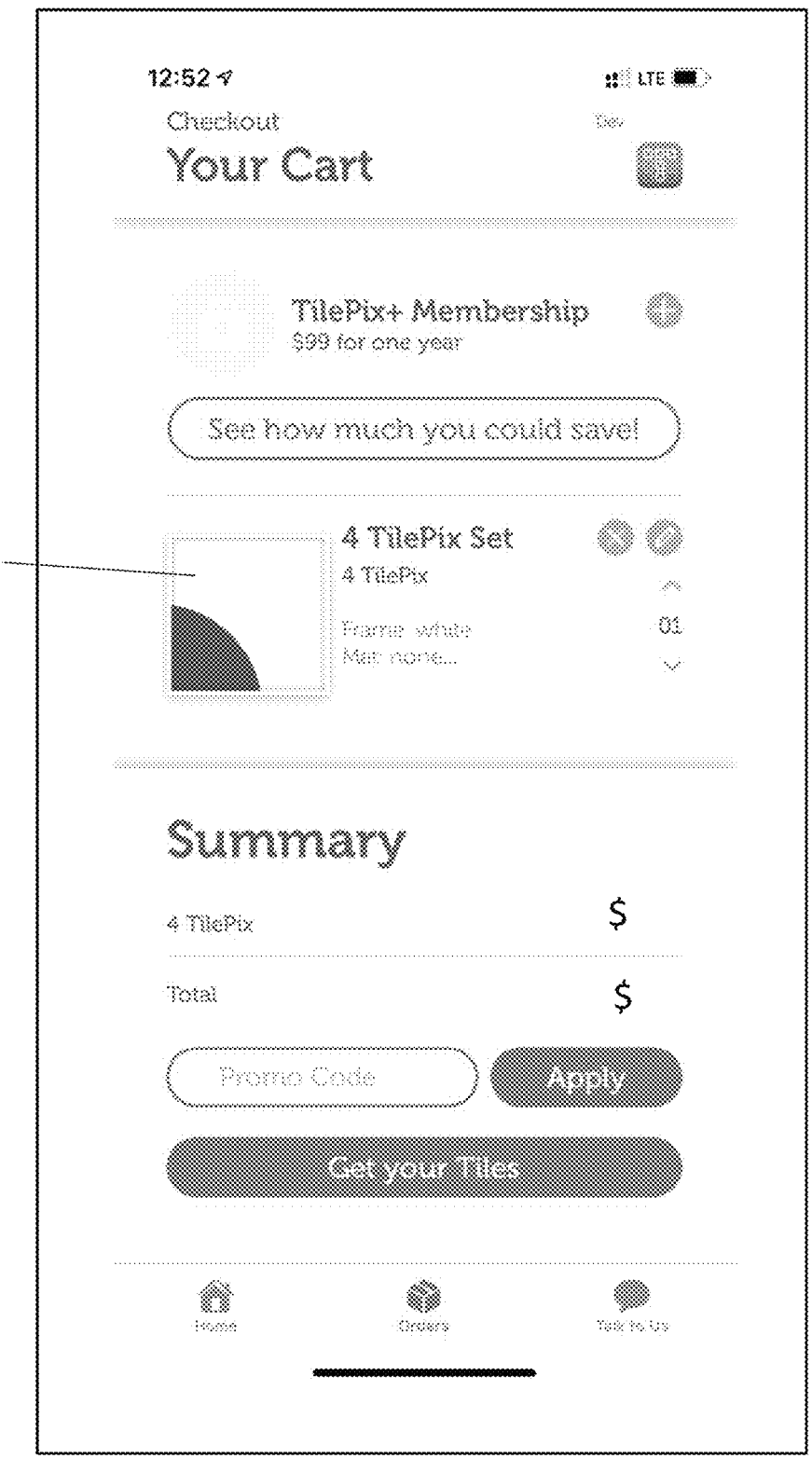
FIG. 29 illustrates an example graphical user interface display screen providing e-commerce functionality and ordering, in accordance with an example implementation of the present disclosure.

In one or more implementations the present disclosure includes an e-commerce component, in which the number of tiles and price is displayed. In particular implementations, a price savings can be earned by joining a membership and/or by submitting a promotion code. FIG. 29 illustrates e-commerce shopping cart that can be included for users to proceed to review an order (section 2902) and purchase respective tiles for production and delivery. When the user has completed making his or her selections, the respective image(s) and options are transmitted to a processing device, such as a secure server that is located and accessible over the Internet, and upon completion of payment processes the respective tiles are produced and delivered to the customer.

Alternative implementations and example graphical user interfaces for providing an image or at least a portion thereof parsed into a series of tiles are supported herein. For example, a user can select a single shape, such as a square, and the x-axis and y-axis slider selectors can be placed in a default position of 1×1, i.e., a square (or other complete shape). Thereafter, as the user moves the x-axis slider control 704 and/or y-axis slider control 706, the image is presented in the respective number of tiles defined by the moved slider selectors (e.g., 4×1). As the slider controls move, the amount of the image that is displayed is altered by a factor of the amount presented by the tiles. For example, if the tiles define a portion representing 25% of the originally selected shape (e.g., the selected square), then 25% of the image will be displayed. This is because the number of tiles defined by the x-axis and y-axis slider selectors make up 25% of the originally selected shape. As the slider selectors are moved to increase the number of tiles, the corresponding amount of the displayed original image increases. Moreover, as the user selects an option to increase the amount of space between each respective tile, the amount of the image displayed by all of the tiles and space therebetween, combined, correspondingly increases. This provides a convenient and intuitive way to define the amount of an image to be present in a series of tiles in accordance with the present disclosure.

FIGS. 30-35 illustrate an alternative implementation of the present disclosure that includes graphical user interface display screens showing a different example layout, and including screen controls shown and described herein. In addition, FIGS. 30-35 include view zoom level control 3002 that, when selected, provides for altering the view zoom level in image view section 602. Increasing (or decreasing) the zoom level allows for improved precision. Furthermore, FIGS. 30-35 include slider lock control 3004 that, when selected, causes the respective slider controls 704 and 706 to move together, essentially as locked. For example, if x-axis slider control 704 is set to a value of 3 and y-axis slider control 706 is set to a value of 4, and slider lock control 3004 is selected, moving either the x-axis slider control 704 or the y-axis slider control 706 to increase by a value of one causes the two slider controls 704 and 706 to move together and result in a 4×5 tile grid.

Figure 30:
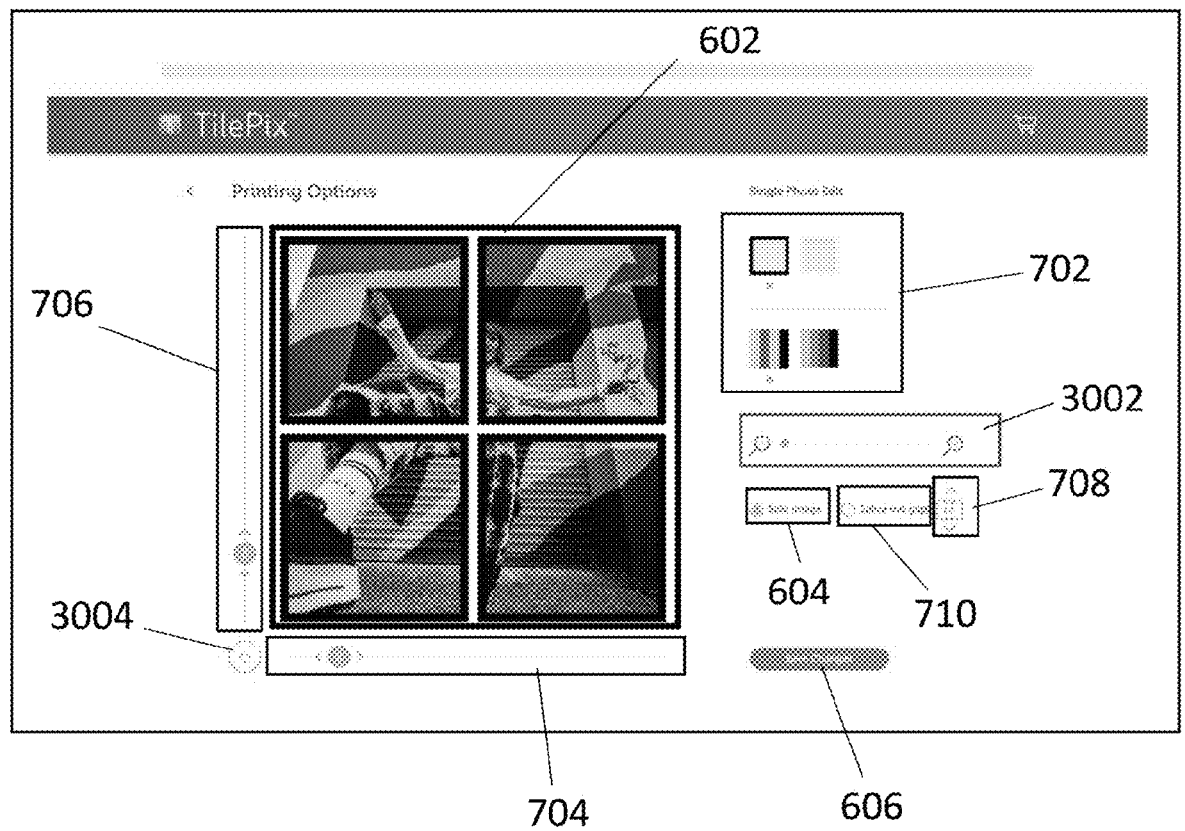
FIGS. 30-32 illustrate example graphical user display screens in accordance with an alternative implementation of the present disclosure.
Figure 31:
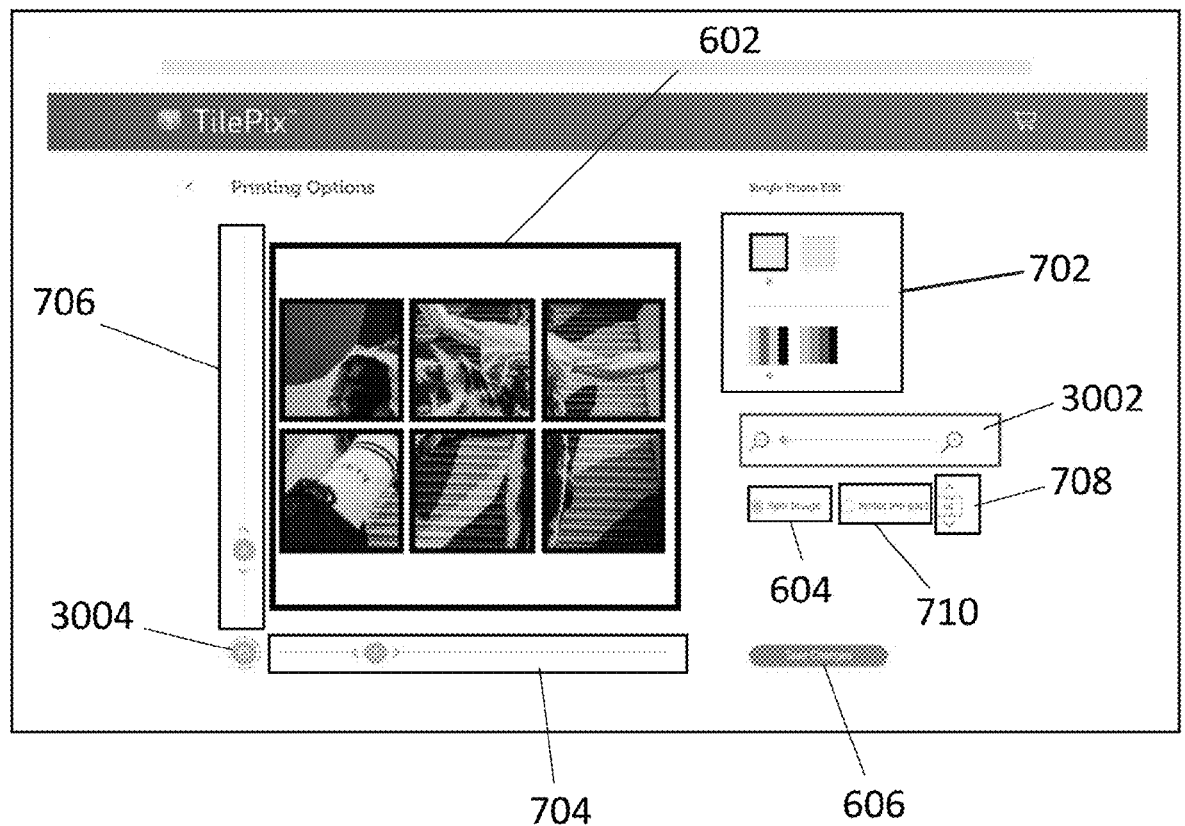
Figure 32:
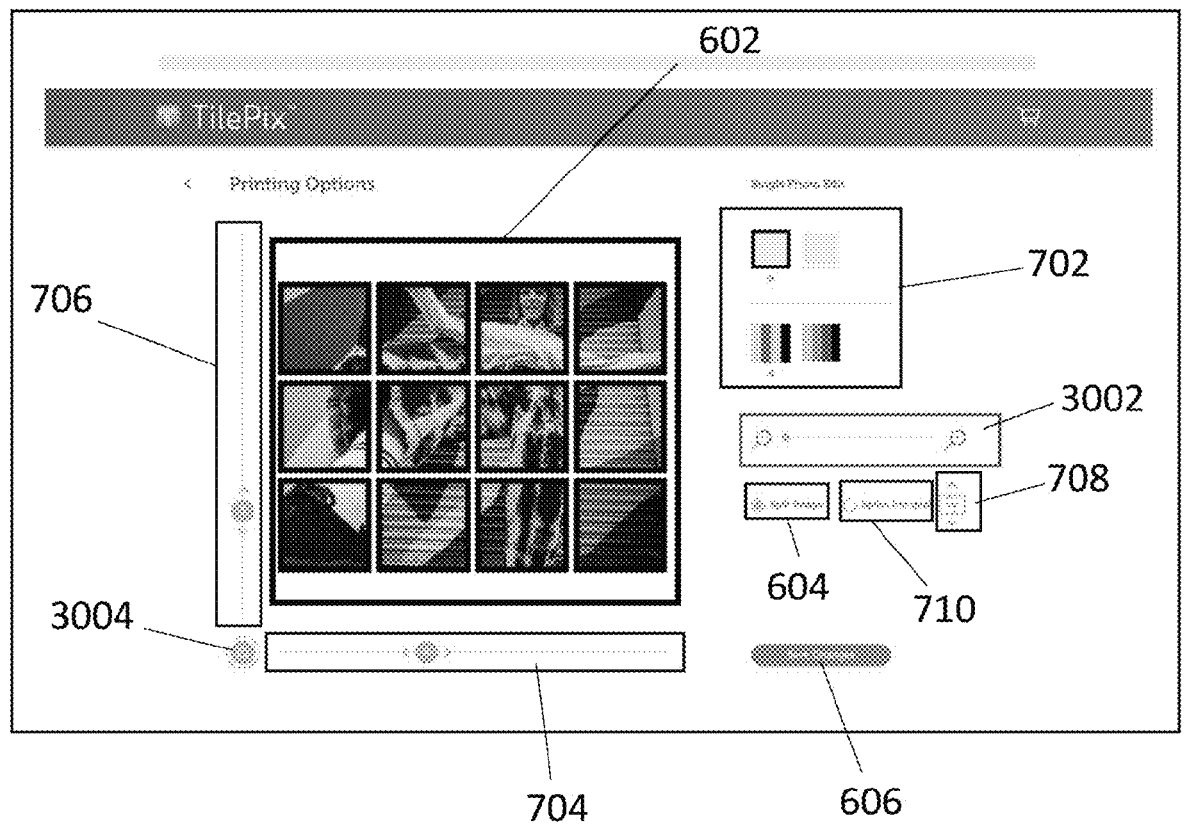

In FIG. 30, for example, an image is parsed across a 2×2 tile grid and the slider lock control 3004 is not selected. When the y-axis slider control 706 is increased by a value of one, the image gets parsed across a 2×3 tile grid, as shown in FIG. 31. In FIG. 31, the slider lock control 3004 is selected and either the x-axis slider control 704 or the y-axis slider control 706 is increased by a value of one, resulting in the image being parsed across a 3×4 tile grid, as shown in FIG. 32.

Thus, as shown and described herein, implementations of the present disclosure can include one or more processes for calculating and representing overall dimensional measurements of a final layout, which can be represented in a graphical user interface, such as on opposing axes or elsewhere. For example, a user parses an image to be created on a 5×7 tile layout, with a 1 inch spacing between each of the tiles. In such instance, the overall height of the layout would be 62 inches by a width of 44 inches. In one or more implementations, the projected dimensions (62 inches by 44 inches) can be depicted in measurement bars along two axes.

Other features are supported by the present disclosure. For example, a form of a virtual loupe can be provided, such as by a user pressing and holding a respective tile in a tile grid. In such case, a zoomed-in view of that tile or portion thereof can be provided while the user continues pressing. In one or more implementations, while displaying a virtual loupe, the user can slide around the display screen to view zoomed in portions where the virtual loupe appears.

Figure 33:
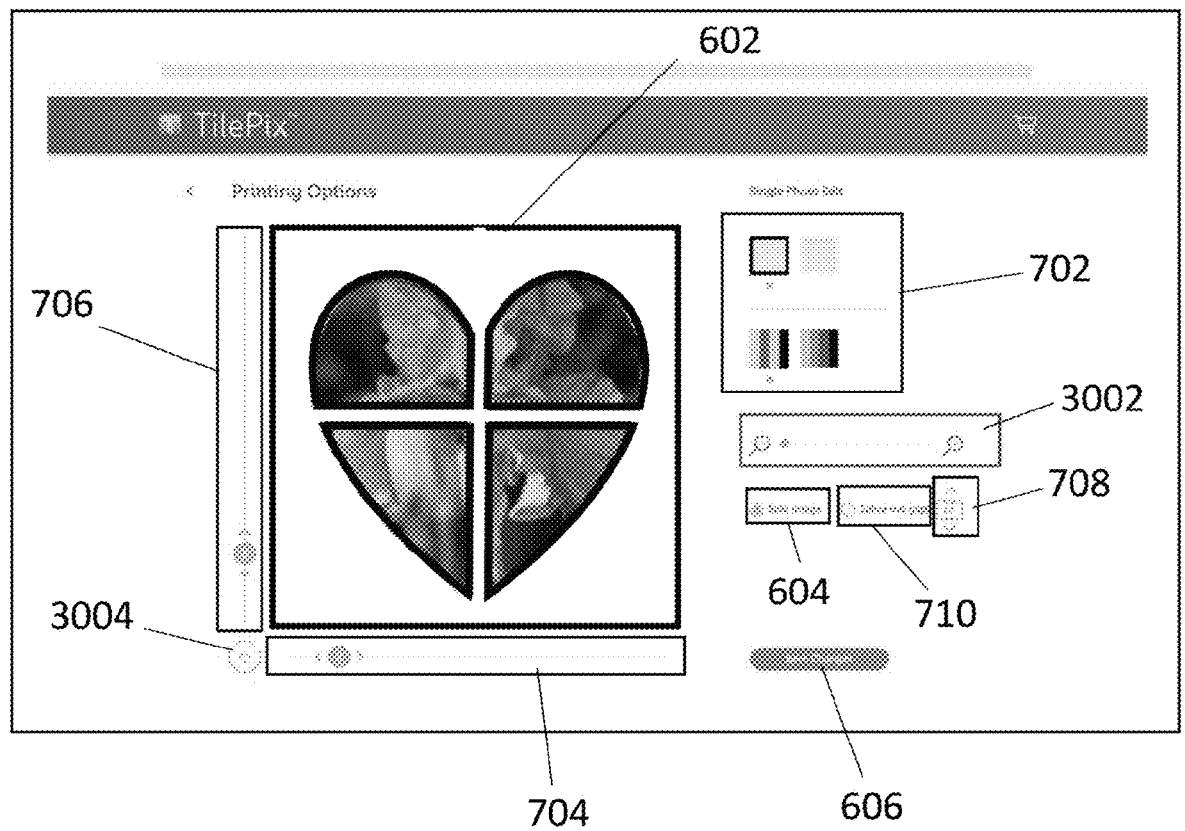
FIG. 33 illustrates an example graphical user display screen in accordance with an alternative implementation of the present disclosure in which vectors are used to define an initial shape.

In one or more implementations, the present disclosure supports the use of vectors to form particular shapes that are more complex than, for example, squares, circles, triangles, diamonds, or the like. Use of vectors enables virtually any shape to be defined as an initial layout for an image to be parsed into a grid. FIG. 33 illustrates an example graphical user display screen in accordance with an alternative implementation of the present disclosure in which vectors are used to define a heart for an initial shape for parsing an image. In this way, virtually any shape, including shapes formed from other images (e.g., outlines of people, animals, plants, or things) can be used.

In one or more implementations, shapes in the form of strips or thin rectangles can be part of an initial vector to define a shape example, long/thin rectangles and/or short/wide rectangles, as well as circles of varying sizes, can be used to form unique shapes, such as the heart shape shown in FIG. 33. Alternatively, or in addition, a library of shape templates can be accessed by a user and one or more can be for an initial shape or layout (not shown). Moreover, once an initial template is selected, one or more slider controls can be provided to lengthen the height and/or width of the shape. In one or more implementations, a number of strips can be added to or removed from a selected template in order to accommodate a respective dimension. In addition, a determination of image resolution is used as a basis to define respective boundaries, including image template height and width sizes. For example, if an image resolution is lower than a predefined value or percent, then specific size restrictions (e.g., height and width) may be imposed in the graphical user interface to preclude the degradation. Alternatively, or in addition, alerts such as shown and described herein can be provided to identify potential issues with regard to image resolution, or the like.

Figure 34:
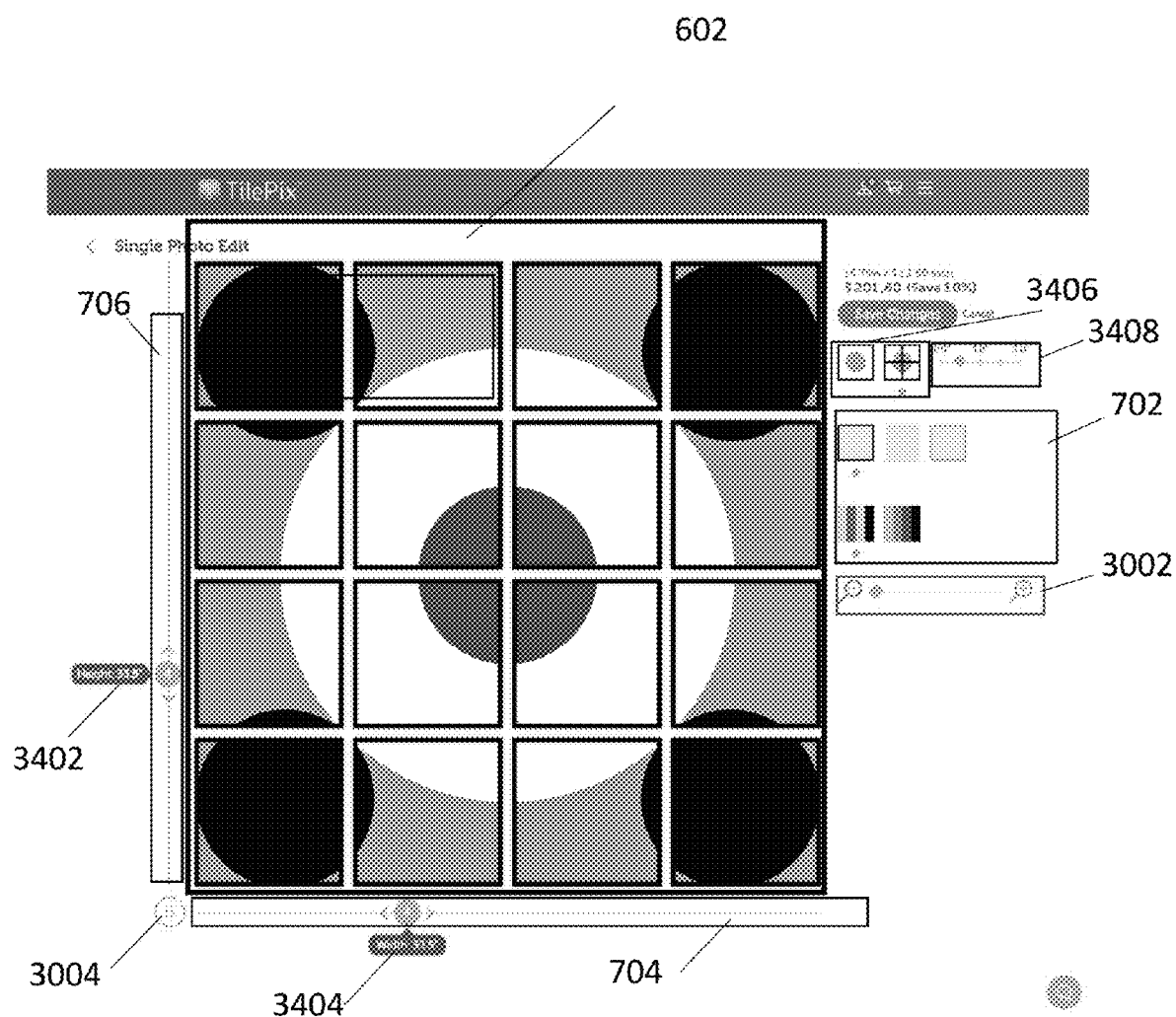
FIGS. 34 and 35 illustrate example graphical user display screens in accordance with alternative implementations of the present disclosure, which include overall dimensions of each axis and user selected spacing.
Figure 35:
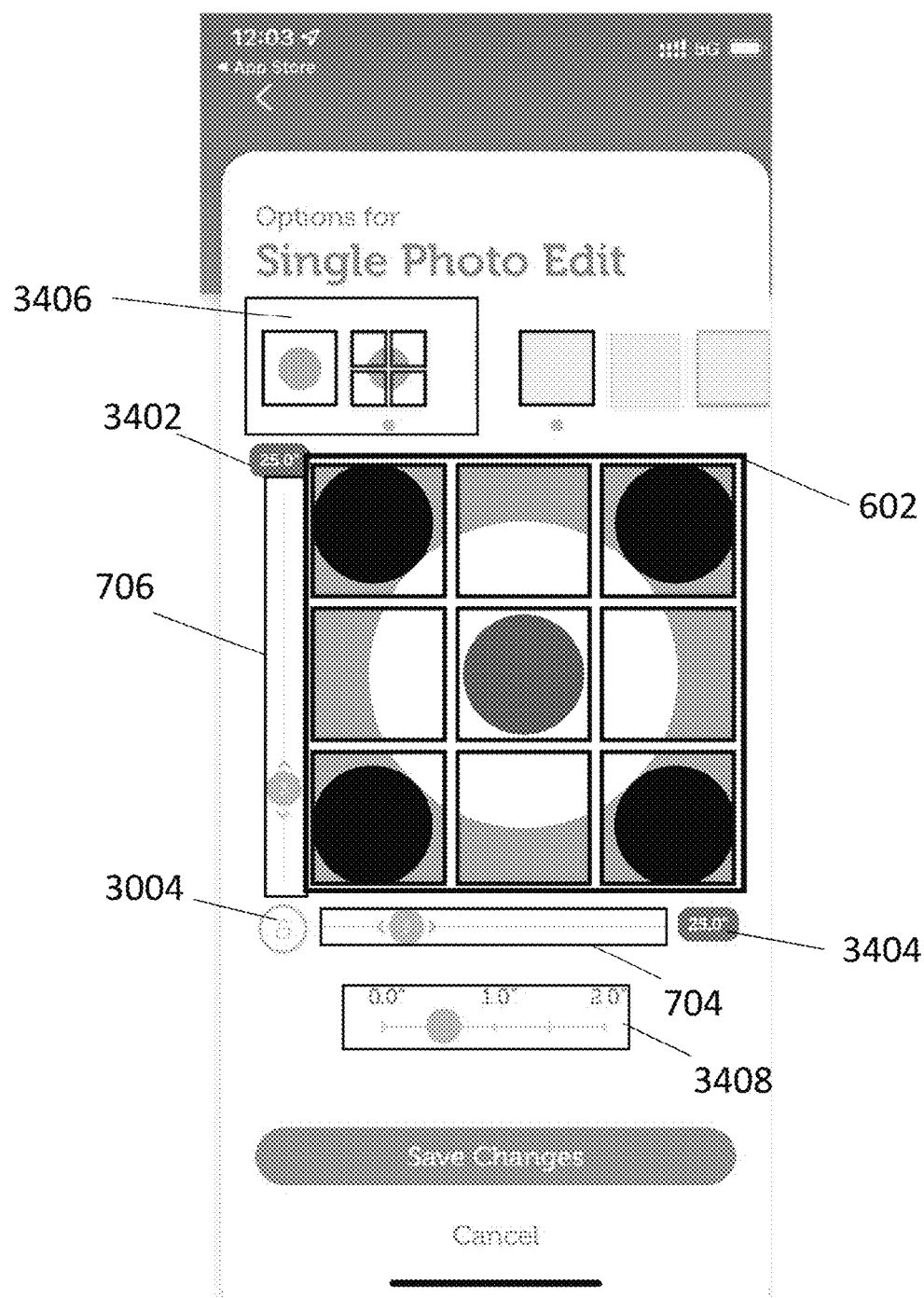

Moreover, FIGS. 34 and 35 illustrate example graphical user display screens in accordance with alternative implementations of the present disclosure, which include overall dimensions of each axis and user selected spacing. For example, height display 3402 and width display 3404 inform width and height dimensions, respectively, including user selected spacing. Moreover, as indicated in split option 3406, a selection is made by the user to split an image across multiple tiles. If, alternatively, the user had selected the single frame option on the left, the image would appear in a single tile, and not be split across multiple tiles. As noted herein, after a user selects an option to split an image, the image is presented to the user with the maximum number of tiles over which that image could appear at the respective acceptable resolution. In addition, and as illustrated in FIGS. 34 and 35, spacing slider control 3408 is shown to enable the user to adjust an amount of space between each panel, such as shown and described above in control 708.

Other features and options are also supported herein. For example, the present disclosure supports use of augmented reality to preview tiles and respective layouts substantially in real-time in an environment of the user, such as on a user's wall. Moreover, layouts can be provided using augmented reality to display tiles in proper proportions. For example, a photograph of the user's wall or other environment can be received and used with augmented reality to provide an image of the environment with tiles therein. Such image of the environment with tiles therein can be used in various ways, such as to confirm a sale or other process, for sharing via social media, or other suitable way.

Thus, particular embodiments of the subject matter described in this specification have been described. It is understood, for example, the actions recited herein can be performed in a different order and still achieve desirable results. As one example, the processes depicted herein do not necessarily require the particular order shown, or sequential order, to achieve desirable results. In certain implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this disclosure, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The systems and methods are not limited in any way to the illustrated embodiments and/or arrangements as the illustrated embodiments and/or arrangements described below are merely exemplary of the systems and methods, which can be embodied in various forms. Therefore, it is to be understood that any structural and functional details disclosed herein are not to be interpreted as limiting the systems and methods, but rather are provided as a representative embodiment and/or arrangement for teaching one skilled in the art one or more ways to implement the systems and methods.

Although the present disclosure has been shown and described in relation to particular embodiments thereof, other variations and modifications and other uses are included herein. It is preferred, therefore, that the present invention not be limited by the specific disclosure herein.

What is claimed:

1. A non-transitory computer readable medium comprising a computer program product having stored program instructions which, when executed by at least one processor, cause the at least one processor to perform the following:
    provide, on a device configured with the at least one processor, a graphical user interface;
    receive, via the graphical user interface, information representing an image;
    display, via the graphical user interface, the image;
    receive, via at least one graphical screen control provided in the graphical user interface, at least one value representing a first plurality of tiles consisting of a first grid;
    process the image, as a function of the at least one value, by splitting the image into a first plurality of parts and respectively displaying respective ones of the first plurality of parts of the image in respective ones of the first plurality of tiles in the first grid, wherein each of the first plurality of tiles in the first grid is separated by an amount of space;
    receive, via the graphical user interface, at least one other value representing a second plurality of tiles consisting of a second grid;
    process the image, as a function of the at least one other value, by splitting the image into a second plurality of parts and displaying respective ones of the second plurality of parts of the image in respective ones of the second plurality of tiles in the second grid, wherein each of the second plurality of tiles in the second grid is separated by the amount of space;
    determine a difference between a i) resolution of the image and a ii) resolution of the image split into the first or second plurality of tiles, wherein each of the first or second plurality of tiles is separated by the amount of space, exceeds a threshold value; and
    provide, via the graphical user interface in response to the determined difference exceeding the threshold value, a warning.

2. The non-transitory computer readable medium of claim 1, wherein the stored program instructions, when executed by at least one processor, further cause the at least one processor to:
    provide, via the graphical user interface, an x-axis slider control and a y-axis slider control, wherein the at least one value is received as a function of a position of the x-axis slider control and the y-axis slider control, and further wherein the at least one other value is received as a function of a change in the position of at least one of the x-axis slider control and the y-axis slider control.

3. The non-transitory computer readable medium of claim 1, wherein the stored program instructions, when executed by at least one processor, further cause the at least one processor to:
    receive, via the graphical user interface, a value representing an update to the amount of space between tiles; and
    automatically display, via the graphical user interface, each of the first plurality of tiles in the first grid or each of the second plurality of tiles in the second grid separated by the updated amount of space.

4. The non-transitory computer readable medium of claim 1, wherein the stored program instructions, when executed by at least one processor, further cause the at least one processor to:
    provide the warning by altering a color of at least one screen control in the graphical user interface.

5. The non-transitory computer readable medium of claim 1, wherein the stored program instructions, when executed by at least one processor, further cause the at least one processor to:
    provide, in response to an instruction received via the graphical user interface, a zoomed-in view of a portion of the image displayed in the graphical user interface.

6. The non-transitory computer readable medium of claim 1, wherein the stored program instructions, when executed by at least one processor, further cause the at least one processor to:
    receive, via the graphical user interface, an instruction to provide prints of the second plurality of tiles; and
    receive, via the graphical user interface, a payment for the prints of the second plurality of tiles.

7. The non-transitory computer readable medium of claim 1, wherein the stored program instructions, when executed by at least one processor, further cause the at least one processor to:
    provide, in the graphical user interface, an image view section;
    display, in the image view section of the graphical user interface, the image;
    display, in the image view section of the graphical user interface, the image split into the first plurality of tiles; and automatically display, in the image view section of the graphical user interface, the image split into the second plurality of tiles.

8. The non-transitory computer readable medium of claim 1, wherein the stored program instructions, when executed by at least one processor, further cause the at least one processor to:
position at least the first plurality of tiles into a respective shape.

9. The non-transitory computer readable medium of claim 8, wherein the respective shape is defined as a function of at least one vector.

10. A system, comprising:
at least one processor configured by executing stored program instructions stored on non-transitory processor readable media to perform the following:
provide, on a device configured with the at least one processor, a graphical user interface;
display, via the graphical user interface, an image;
receive, via at least one graphical screen control provided in the graphical user interface, at least one value representing a first plurality of tiles consisting of a first grid;
process the image, as a function of the at least one value, by splitting the image into a first plurality of parts and respectively displaying respective ones of the first plurality of parts of the image in respective ones of the first plurality of tiles in the first grid, wherein each of the first plurality of tiles in the first grid is separated by an amount of space;
receive, via the graphical user interface, at least one other value representing a second plurality of tiles consisting of a second grid;
process the image, as a function of the at least one other value, by splitting the image into a second plurality of parts and displaying respective ones of the second plurality of parts of the image in respective ones of the second plurality of tiles in the second grid, wherein each of the second plurality of tiles is separated by the amount of space;
determine a difference between a i) resolution of the image and a ii) resolution of the image split into the first or second plurality of tiles, wherein each of the first or second plurality of tiles is separated by the amount of space, exceeds a threshold value; and
provide, via the graphical user interface in response to the determined difference exceeding the threshold value, a warning.

11. The system of claim 10, wherein the stored program instructions, when executed by at least one processor, further cause the at least one processor to:
receive, via at least one graphical screen control, at least one value representing the amount of space.

12. The system of claim 10, wherein the stored program instructions, when executed by at least one processor, further cause the at least one processor to:
receive, via the graphical user interface, a value representing an update to the amount of space between tiles; and
display the initial plurality of tiles or the updated plurality of tiles separated by the other amount of space.

13. The system of claim 10, wherein the stored program instructions, when executed by at least one processor, further cause the at least one processor to:
provide, in the graphical user interface, an image view section;
display, in the image view section of the graphical user interface, the image;
display, in the image view section of the graphical user interface, the image parsed into the initial plurality of tiles; and
automatically display, in the image view section of the graphical user interface, the image parsed into the updated plurality of tiles.

14. A computer-implemented method, comprising:
providing, on a device configured with the at least one processor, a graphical user interface;
receiving, by the device via the graphical user interface, information representing an image;
displaying, by the device via the graphical user interface, the image;
receiving, by the device via at least one graphical screen control provided in the graphical user interface, at least one value representing a first plurality of tiles consisting of a first grid;
processing, by the device, the image, as a function of the at least one value, by splitting the image into a first plurality of parts and respectively displaying respective ones of the first plurality of parts of the image in respective ones of the first plurality of tiles in the first grid, wherein each of the first plurality of tiles in the first grid is separated by an amount of space;
receiving, by the device via the graphical user interface, at least one other value representing a second plurality of tiles consisting of a second grid;
processing, by the device, the image, as a function of the update to the at least one other value, by splitting the image into a second plurality of parts and displaying respective ones of the second plurality of parts of the image in respective ones of the second plurality of tiles in the grid, wherein each of the second plurality of tiles is separated by the amount of space;
determining, by the device, that a difference between a i) resolution of the image and a ii) resolution of the image being parsed into the second plurality of tiles, wherein each of the second plurality of tiles is separated by the amount of space, exceeds a threshold value; and
providing, by the device via the graphical user interface in response to the determined difference exceeding the threshold value, a warning.

15. The method of claim 14, further comprising:
providing, by the device via the graphical user interface, an x-axis slider control and a y-axis slider control, wherein the at least one value is received as a function of a position of the x-axis slider control and the y-axis slider control, and further wherein the and the update to the at least one value is received as a function of a change in the position of at least one of the x-axis slider control and the y-axis slider control.

16. The method of claim 14, further comprising:
receiving, by the device via the graphical user interface, a value representing a further updated amount of space between tiles; and
automatically displaying, by the device via the graphical user interface, the respective ones of the second plurality of parts of the image in respective ones of the second plurality of tiles in the grid separated by the further updated amount of space.

17. The method of claim 14, further comprising:
providing, by the device, the warning by altering a color of at least one screen control in the graphical user interface.

18. The method of claim 14, further comprising:
providing, in the graphical user interface, an image view section;
displaying, in the image view section of the graphical user interface, the image;
displaying, in the image view section of the graphical user interface, the image parsed into the first plurality of tiles in the first grid; and
automatically displaying, in the image view section of the graphical user interface, the image parsed into the second plurality of tiles in the second grid.

* * * * *